US012567887B2

(12) United States Patent
Horn et al.

(10) Patent No.: US 12,567,887 B2
(45) Date of Patent: Mar. 3, 2026

(54) TECHNIQUES FOR MULTI-ALLOCATION PRECODING

(71) Applicant: QUALCOMM Incorporated, San Diego, CA (US)

(72) Inventors: Idan Michael Horn, Hod Hasharon (IL); Assaf Touboul, Netanya (IL); Yehonatan Dallal, Kfar Saba (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 357 days.

(21) Appl. No.: 18/303,320

(22) Filed: Apr. 19, 2023

(65) Prior Publication Data

US 2024/0356590 A1 Oct. 24, 2024

(51) Int. Cl.
*H04B 7/06* (2006.01)
*H04B 7/0456* (2017.01)
*H04W 72/23* (2023.01)

(52) U.S. Cl.
CPC ......... *H04B 7/0456* (2013.01); *H04B 7/0634* (2013.01); *H04W 72/23* (2023.01)

(58) Field of Classification Search
None
See application file for complete search history.

(56) References Cited

U.S. PATENT DOCUMENTS

2013/0121438 A1* 5/2013 Murakami ........ H04L 25/03898
375/295

* cited by examiner

*Primary Examiner* — Minh Trang T Nguyen
(74) *Attorney, Agent, or Firm* — QUALCOMM Incorporated

(57) ABSTRACT

Certain aspects of the present disclosure provide techniques for wireless communication. A method performed by a user equipment (UE) includes receiving configuration information for receiving a first multi-allocation precoding transmission from a network entity; receiving, from the network entity, the first multi-allocation precoding transmission including a first plurality of differently precoded signals corresponding to a first modulated signal, wherein each differently precoded signal of the first plurality of differently precoded signals corresponds to a respective different portion of a first modulated signal, and a different antenna element of a first plurality of antenna elements of the network entity; combining the first plurality of differently precoded signals to obtain the first modulated signal; and demodulating the first modulated signal.

30 Claims, 13 Drawing Sheets

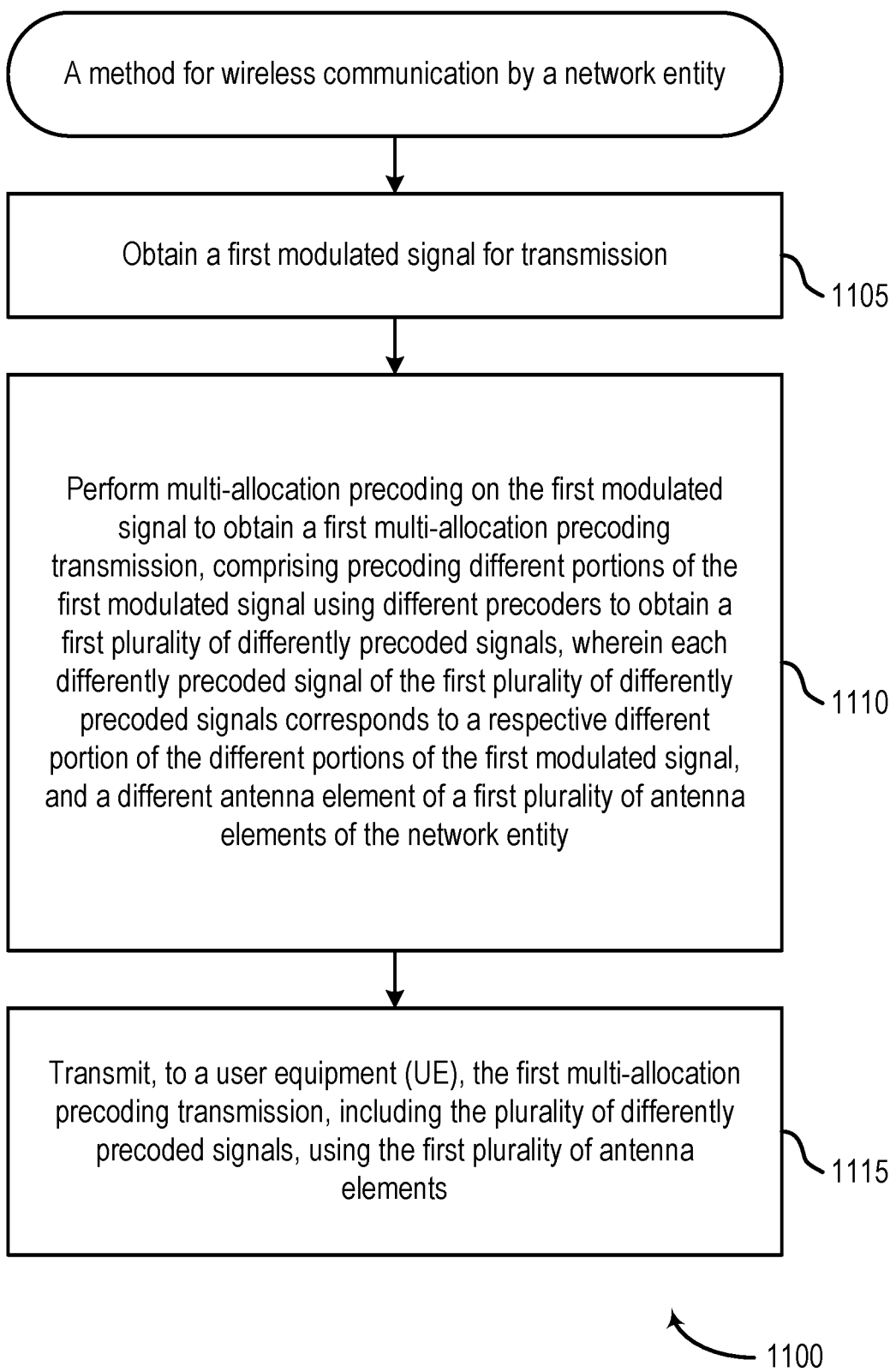

A method for wireless communication by a network entity

Obtain a first modulated signal for transmission                1105

Perform multi-allocation precoding on the first modulated
signal to obtain a first multi-allocation precoding
transmission, comprising precoding different portions of the
first modulated signal using different precoders to obtain a
first plurality of differently precoded signals, wherein each
differently precoded signal of the first plurality of differently
precoded signals corresponds to a respective different
portion of the different portions of the first modulated signal,
and a different antenna element of a first plurality of antenna
elements of the network entity                1110

Transmit, to a user equipment (UE), the first multi-allocation
precoding transmission, including the plurality of differently
precoded signals, using the first plurality of antenna
elements                1115

TECHNIQUES FOR MULTI-ALLOCATION PRECODING

BACKGROUND

Field of the Disclosure

Aspects of the present disclosure relate to wireless communications, and more particularly, to techniques for multi-allocation precoding.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication by a network entity. The method includes obtaining a first modulated signal for transmission; performing multi-allocation precoding on the first modulated signal to obtain a first multi-allocation precoding transmission, comprising precoding different portions of the first modulated signal using different precoders to obtain a first plurality of differently precoded signals, wherein each differently precoded signal of the first plurality of differently precoded signals corresponds to a respective different portion of the different portions of the first modulated signal, and a different antenna element of a first plurality of antenna elements of the network entity; and transmitting, to a user equipment (UE), the first multi-allocation precoding transmission, including the plurality of differently precoded signals, using the first plurality of antenna elements.

Another aspect provides a method for wireless communication by a user equipment (UE). The method includes receiving configuration information for receiving a first multi-allocation precoding transmission from a network entity; receiving, from the network entity, the first multi-allocation precoding transmission including a first plurality of differently precoded signals corresponding to a first modulated signal, wherein each differently precoded signal of the first plurality of differently precoded signals corresponds to a respective different portion of a first modulated signal, and a different antenna element of a first plurality of antenna elements of the network entity; combining the first plurality of differently precoded signals to obtain the first modulated signal; and demodulating the first modulated signal.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 11 depicts a method for wireless communications.

DETAILED DESCRIPTION

Figure 1:
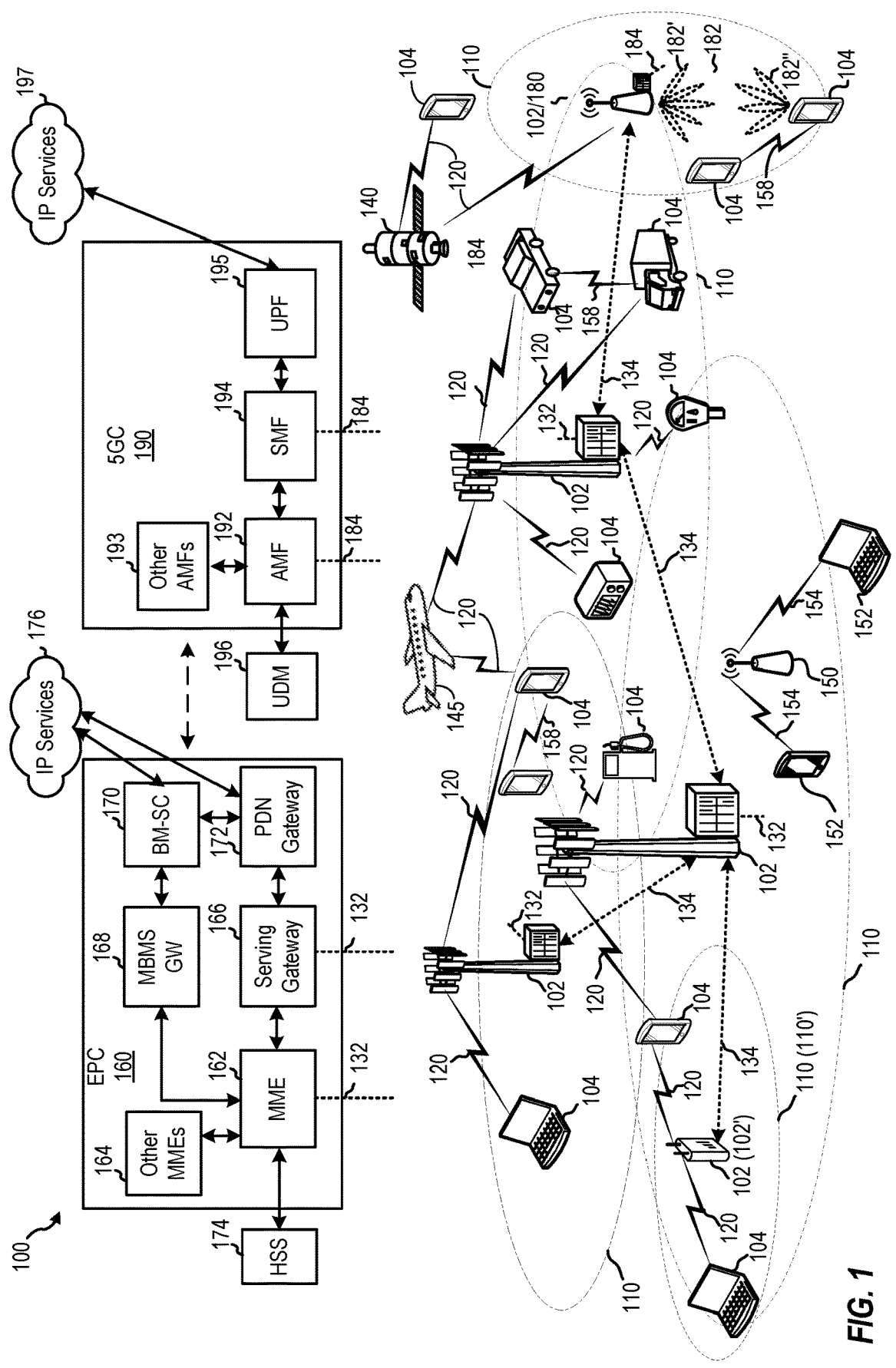
FIG. 1 depicts an example wireless communications network.

Aspects of the present disclosure provide apparatuses, methods, processing systems, and computer-readable mediums for multi-allocation precoding.

In certain wireless communication networks, information may be transmitted using a plurality of symbols that are mapped to different constellation points on a constellation diagram. Each constellation point on the constellation diagram corresponds to a different symbol and represents a different combination of different bits. For example, a first constellation point on the constellation diagram may map to a first symbol representing the bit combination 000 while a second constellation point on the constellation point may map to a second symbol representing the bit combination 101. These techniques of mapping symbols to constellation points allow for a greater amount of information to be transmitted in a wireless communication network since one transmitted symbol represents multiple bits, for example, as compared to the case in which individual bits are transmitted.

When symbols are transmitted to a receiver, the receiver may identify a particular symbol based on a comparison between ideal locations of the constellation points on the constellation diagram and a received signal's phase and amplitude. In many cases, however, a location of the signal on the constellation diagram (e.g., identified based on the signal's phase and amplitude) may not exactly align with an ideal location of a constellation point on the constellation diagram. In some cases, the distance between the received signal and the nearest constellation point is called the error vector, and the magnitude of this vector is known as an error vector magnitude (EVM). EVM is generally a measure of the performance of a transmitter. Lower EVM values indicate better performance, as they indicate that the received signal is closer to the ideal signal represented by the constellation points. Conversely, large values of EVM typically indicate greater distance between measured signal and ideal constellation points, which in turn, indicates a higher probability of bit errors. For example, if EVM is large enough, there may be instances in which a symbol transmitted in a signal from a transmitter is interpreted as a completely different symbol when that signal is received by the receiver.

High EVM values, which may result in distortion of a transmitted signal, may be caused by a variety of factors, including noise, interference, and distortion in the communication channel, as well as imperfections in the hardware of the transmitter. Additionally, EVM-based distortion may be the result of high bandwidth (BW) and high power use cases. Such high BW use cases may include communication based on sub-terahertz (sub-THz) frequency bands, which are considered as a key area for the development of the sixth generation (6G) wireless standard due to their large available bandwidth and the ability to create narrower communication beams. However, communicating using these narrow communication beams in a sub-THz requires a significant amount of power, which may cause issues with EVM. For example, the high bandwidth and high power characteristics of sub-THz communication may limit an EVM that a transmitter is capable of achieving.

Accordingly, aspects of the present disclosure provide techniques for reducing EVM distortion associated with high bandwidth, high power transmissions in transmitter. In some cases, these techniques may involve a transmitter (e.g., a base station, a user equipment, etc.) performing multi-allocation precoding on a modulated signal for transmission, such that different antenna elements of the transmitter are allocated different, non-overlapping frequency portions of an overall bandwidth of a modulated signal. By allocating different, non-overlapping portions of a modulated signal to different antenna elements, a power spectral density (PSD) of each individual antenna element may be improved, which, in turn, improves EVM associated with the transmitter. Improving EVM associated with the transmitter may result in less errors in transmissions received by the receiver. Less errors mean that retransmissions by the transmitter may be reduced or avoided, thereby conserving time-frequency resources in a wireless network (e.g., that would otherwise be needed to transmit these retransmissions if errors occurred at the receiver) and power resources at the transmitter and receiver (e.g., associated with not having to transmit/receive these retransmissions).

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
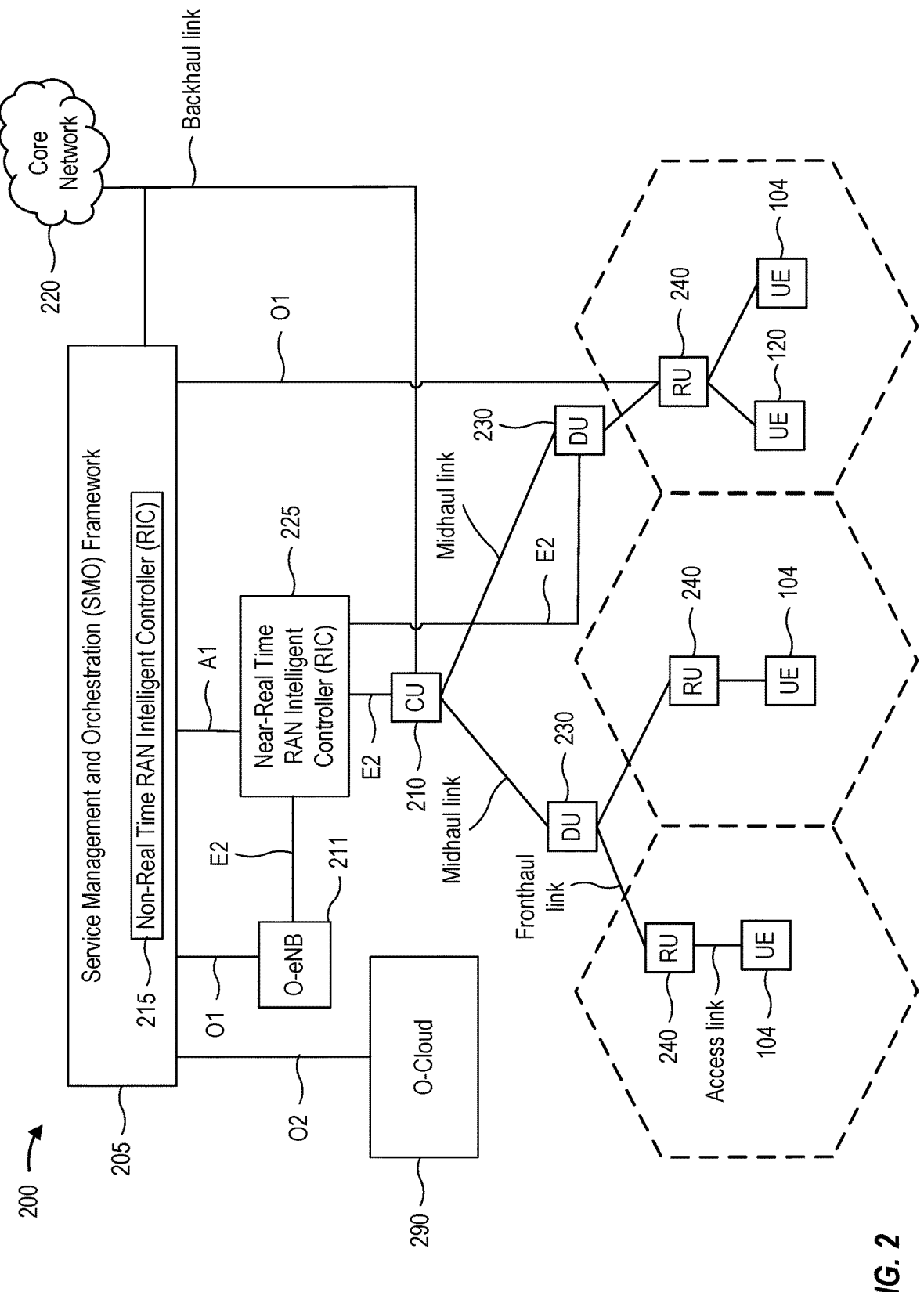
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5GNR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-71,000 MHz, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface).

Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
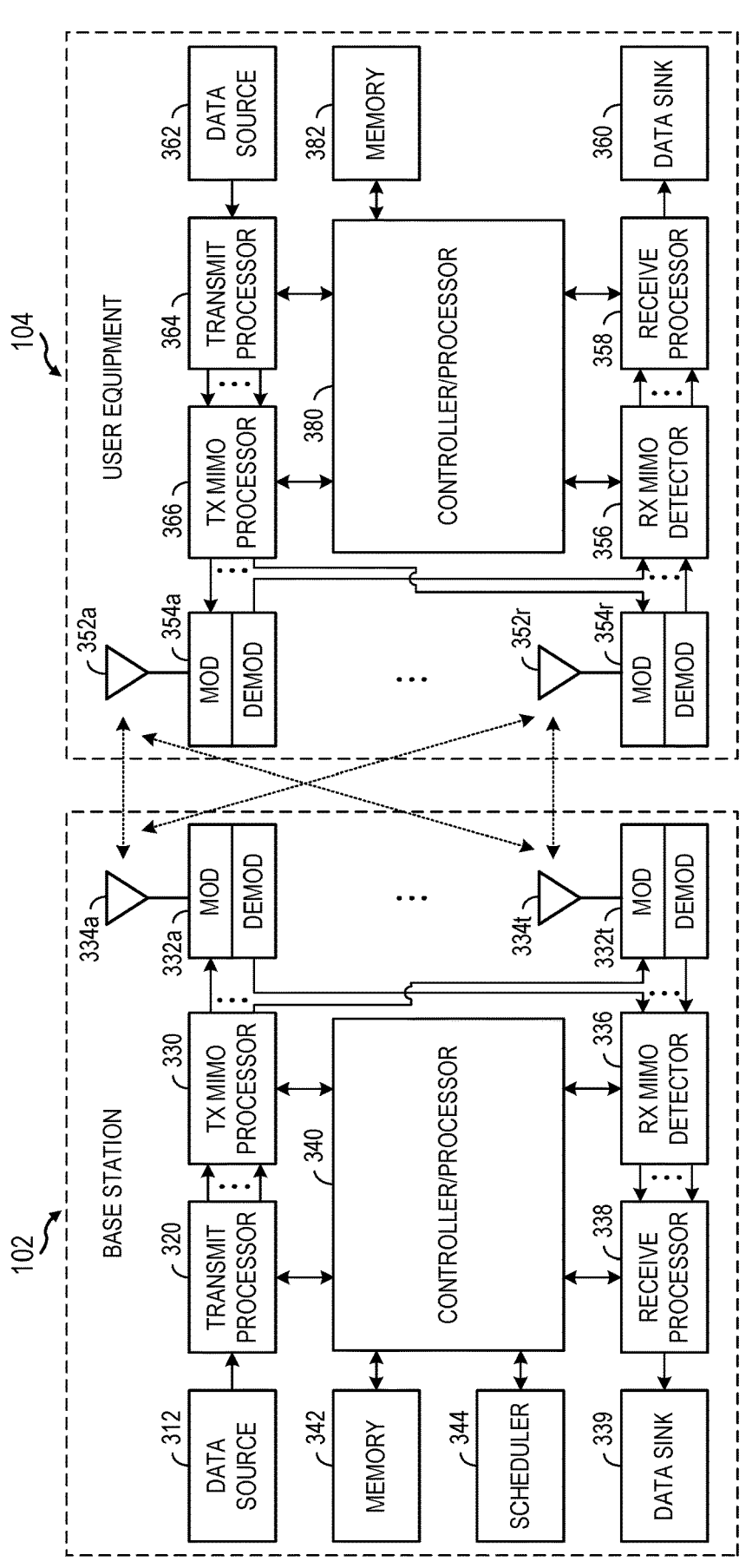
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
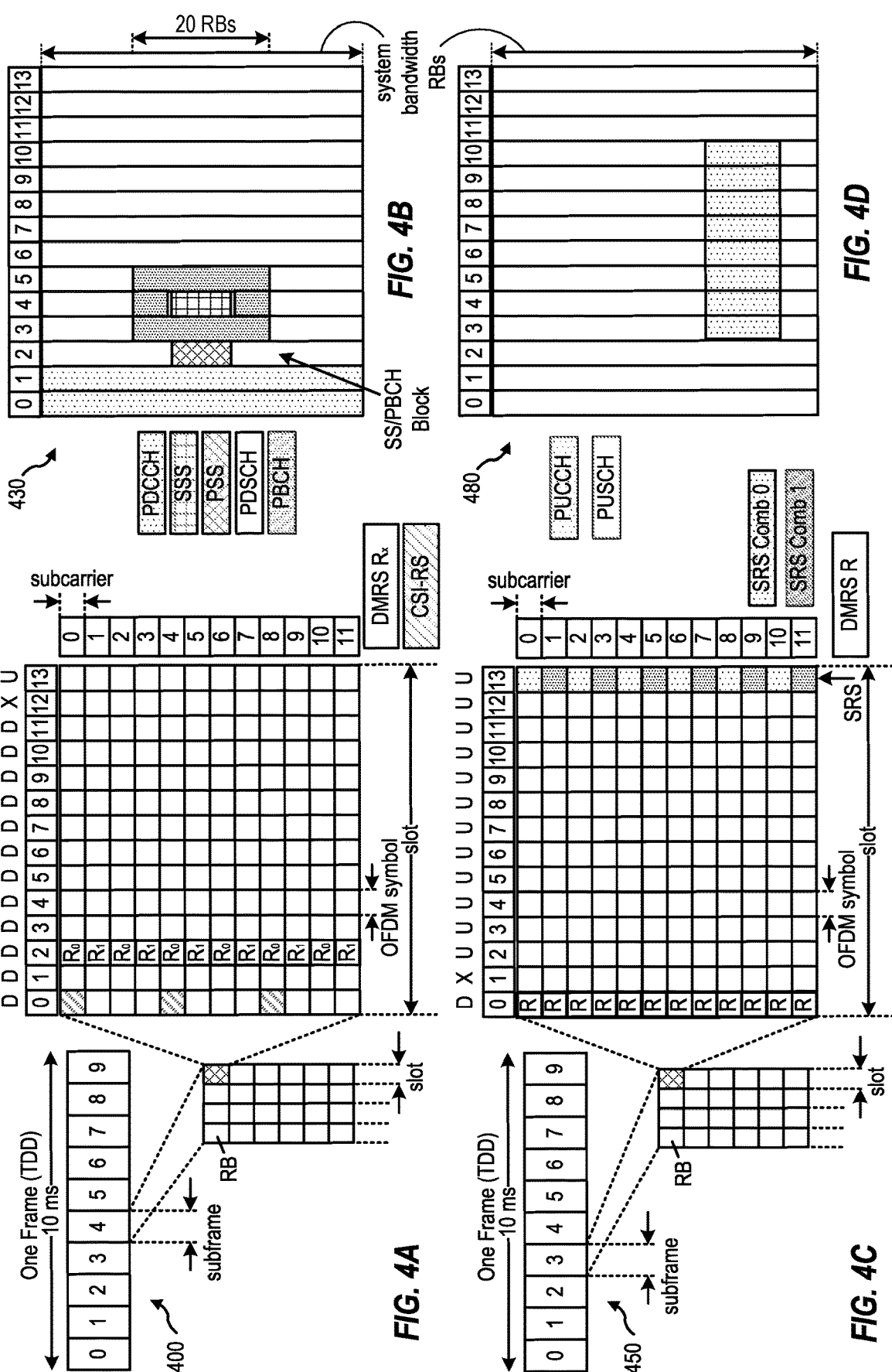
FIGS. 4A, 4B, 4C, and 4D depict various example aspects of data structures for a wireless communications network.

In particular, FIG. 4A is a diagram 400 illustrating an example of a first subframe within a 5G (e.g., 5GNNR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency-domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 6 allow for 1, 2, 4, 8, 16, 32, and 64 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and $2\mu$ slots/subframe. The subcarrier spacing and symbol length/duration are a function of the numerology. The subcarrier spacing may be equal to $2^1 \times 15$ kHz, where is the numerology 0 to 6. As such, the numerology $\mu=0$ has a subcarrier spacing of 15 kHz and the numerology $\mu=6$ has a subcarrier spacing of 960 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Introduction to Error Vector Magnitude (EVM) in Wireless Communication Networks

In some wireless communication networks, high peak-to-average power ratio (PAPR) is increasingly a concern as it can impact the quality of a signal transmitted by a communications device. For example, some wireless communication networks, such as 5G new radio (NR), use an orthogonal frequency-division multiple access (OFDMA) digital modulation scheme. OFDMA offers multiple access by assigning subsets of subcarriers in each symbol to different users, making efficient use of radio resources. OFDMA also provides simple channel estimation at the receiver and flexibility in the utilization of time and frequency resources. However, OFDMA may result in a higher PAPR.

To address the higher PAPR, a higher constellation modulation may be used, such as 256 quadrature amplitude modulation (QAM), 1024 QAM, or 16K QAM, to spread modulation symbols across the subcarriers. For such higher constellation modulations, a high-power power amplifier (PA) may be used to amplify the signal. High-power PAs may have limited linear dynamic range and may generate non-linear components causing distortion in the signal output from the PA.

Ideally, amplifiers should be perfectly linear, which means the output signal should be an exact amplified copy of the input signal. However, real PAs are not perfectly linear because amplifying devices, such as transistors or vacuum tubes, are non-linear by nature which introduces some amount of non-linearity in the output (e.g., the amplified signal) of the PA. Non-linearity generates spectral re-growth, which leads to interference and can lead to violation of emissions standards set by regulatory bodies. Non-linearity can also lead to the degradation of the bit-error rate (BER) and data throughput of the communication system.

In some cases, non-linear distortion may be in-band. In-band distortion can impact the link performance by reducing mutual information and/or causing an increase in the error vector magnitude (EVM). EVM is a measure of the performance of a transmitter and generally is a measure of the deviation of the actual constellation points from their ideal locations in the constellation diagram. For example, a signal sent by an ideal transmitter would have all constellation points at the ideal locations; however, distortion can cause the actual constellation points to deviate from the ideal locations. Thus, large values of EVM typically indicate greater distance between measured and ideal points, which in turn, indicates a higher probability of bit errors.

For example, each point on the constellation diagram represents a specific symbol or combination of bits, which is used to represent a specific message or piece of data. For example, in a quadrature amplitude modulation (QAM) system, there may be multiple points arranged in a grid, where each point represents a unique combination of bits (e.g., a symbol) identified by a received signal's amplitude and phase. In some cases, by varying the signals amplitude and phase, it is possible to signal different combinations of bits/symbols, such as 000, 010, 100, etc.

The symbols represented by constellation points may be chosen to maximize the number of bits that can be transmitted over a given bandwidth. This is because the more symbols that can be transmitted per unit of time, the higher the data rate that can be achieved. However, the decision process at a receiver of determining whether a signal is one symbol over another symbol can be challenging due to the presence of noise and interference in the communication channel.

The decision process generally involves comparing a received signal to the constellation points to determine which symbol was transmitted. More specifically, for example, the receiver may compare the received signal to each of the possible symbols and selecting the symbol that is closest to the received signal. The distance between the received signal and the nearest constellation point is called the error vector, and the magnitude of this vector is known as the EVM. In general, lower EVM values indicate better performance, as they indicate that the received signal is closer to the ideal signal represented by the constellation points. As noted above, large values of EVM typically indicate greater distance between the received signal and ideal points, which in turn, indicates a higher probability of bit errors.

Figures 5A, 5B:
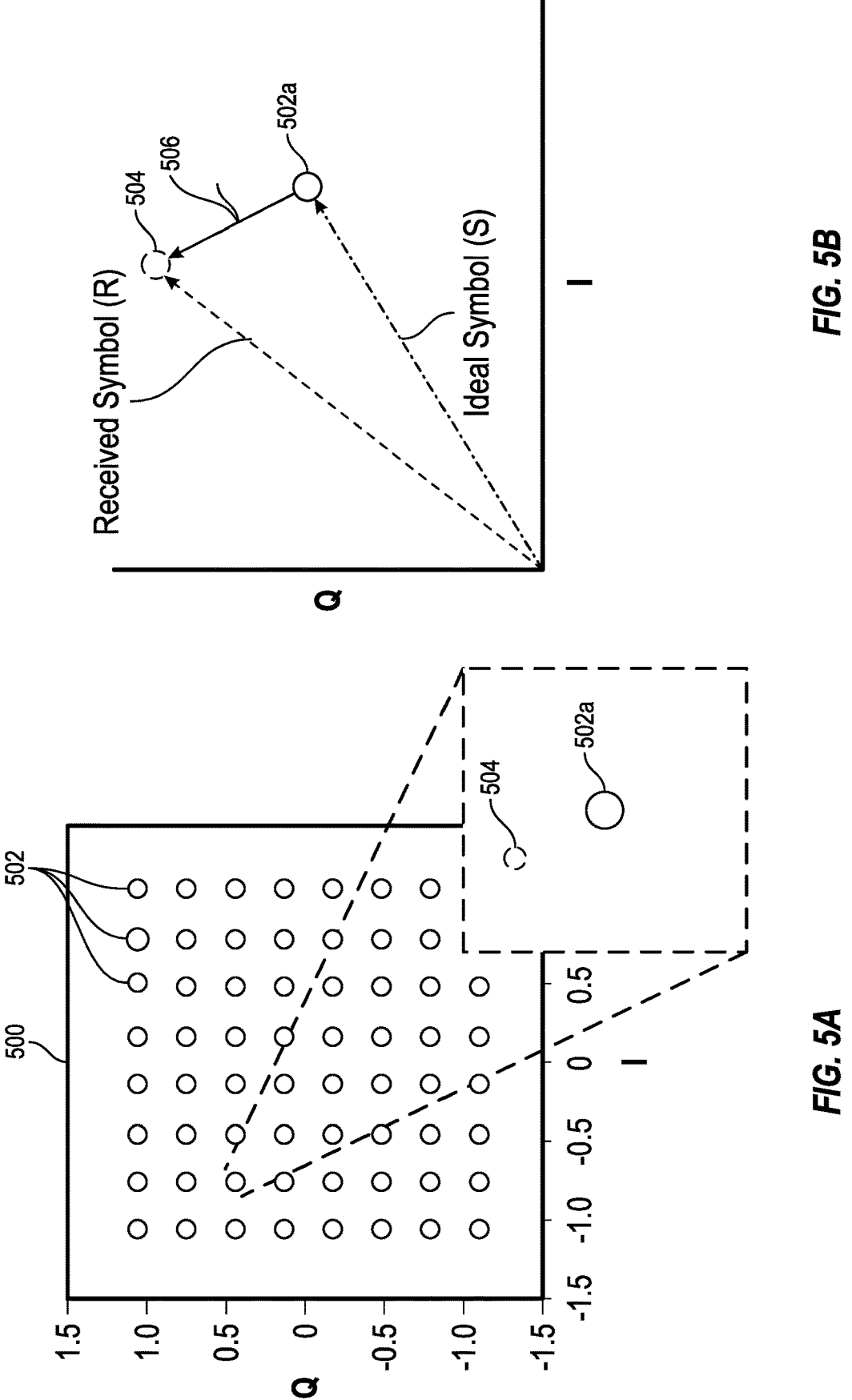
FIGS. 5A and 5B provide an illustration of a constellation diagram and an error vector between a received symbol and an ideal symbol location.

FIGS. 5A and 5B provide an illustration of a constellation diagram and an error vector between a received symbol and an ideal symbol location. More specifically, FIG. 5A illustrates a constellation diagram 500 including a plurality of constellation points 502 in an in-phase (I) and quadrature (Q) grid. In some cases, a receiver may receive a signal from transmitter that includes a symbol 504. In many cases, as shown, the symbol 504 may not be received in an exact location of an ideal constellation point, such as the constellation point 502a. Instead, the symbol 504 may be received at some I-Q "distance" away from the constellation point 502a.

As shown in FIG. 5B, this I-Q distance may be represented by an error vector 506 having a particular magnitude and direction. The receiver may calculate this error vector by comparing the location in which the symbol 504 is received to the location of the constellation point 502. The receiver may repeat this calculation for any additional symbols received from the transmitter. The receiver may then determine an EVM associated with signals received from the transmitter by performing a root means square (rms) operation based on all error vector magnitudes between received symbol locations and their closest ideal constellation locations constitute the EVM value of the device, using Equation 1, below:

$$EVM_{frame} = \sqrt{\frac{\sum_{j=1}^{L_p}\sum_{i=1}^{N_c}(R_{ij}-S_{ij})^2}{N_cL_pP_0}},$$ (1)

where $L_p$ is the number of frames, $P_O$ is the ideal symbol power, $N_c$ is the number of carriers, $R_{i,j}$ is the received symbol, and $S_{i,j}$ is the ideal symbol location.

High EVM values can be caused by a variety of factors, including noise, interference, and distortion in the communication channel, as well as imperfections in the hardware of the transmitter. EVM distortion of a transmitted signal may be the result of a limited effective number of bits (ENOB) of the transmitter's digital-to-analog converter, various nonlinear responses of certain components of the transmitter, clipping and filtering techniques (e.g., crest factor reduction (CFR)), and high bandwidth (BW) and high power use cases.

In some cases, these high BW use cases may include communication based on sub-terahertz (sub-THz) frequency bands (e.g., FR5). Sub-THz bands are considered as a key area for the development of the sixth generation (6G) wireless standard due to their large available bandwidth and the ability to create narrower communication beams, resulting in better spatial separation and lower interference due to a higher beam directionality. However, communicating using these narrow communication beams in a sub-THz requires a significant amount of power. However, the high bandwidth and high power characteristics of sub-THz communication may limit an EVM that a transmitter is capable of achieving.

For example, when increasing a carrier frequency of a transmitted signal, few things happen: (1) the path loss increases due to Friis equation, (2) an output power of a power amplifier of the transmitter is reduced due to technology limitations, and (3) an available bandwidth increases. When the bandwidth is increased without changing a transmission power of the transmitted signal, power per symbol may be reduced (e.g., due to Parseval). On the other hand, the noise power may increase when the bandwidth increases making it dominant at the transmitter (e.g., as compared to lower bands where the AWGN and interference is the dominant noise at the receiver). Noises experienced at the transmitter may include nonlinear distortion, limited ENOB that comes from the DACs, out-of-band signals that were not filtered sufficiently, and sometimes even thermal noise.

In some cases, EVM distortion may be viewed as a frequency-domain noise floor that is not affected by power spectral density (PSD) or peak-to-average-power (PAPR) of a transmitted signal. Additionally, because EVM distortion may be created by analog front end elements of a transmitter, different antenna elements of the transmitter may have different EVM frequency-domain noise floors, which may not depend on the data that is transmitted via each antenna element.

In some cases, to help reduce EVM distortion, multiple antenna elements or panels of a transmitter may be used to transmit a reduced number of layers (e.g., a number of layers less than a total number of layers capable of being transmitted by the multiple antenna elements). For example, in some cases, assuming the transmitter includes two antenna elements, the two antenna elements may be used to transmit a single, same layer or signal. An example of transmitting a same signal or layer via multiple antenna elements is illustrated in FIG. 6.

Figure 6:
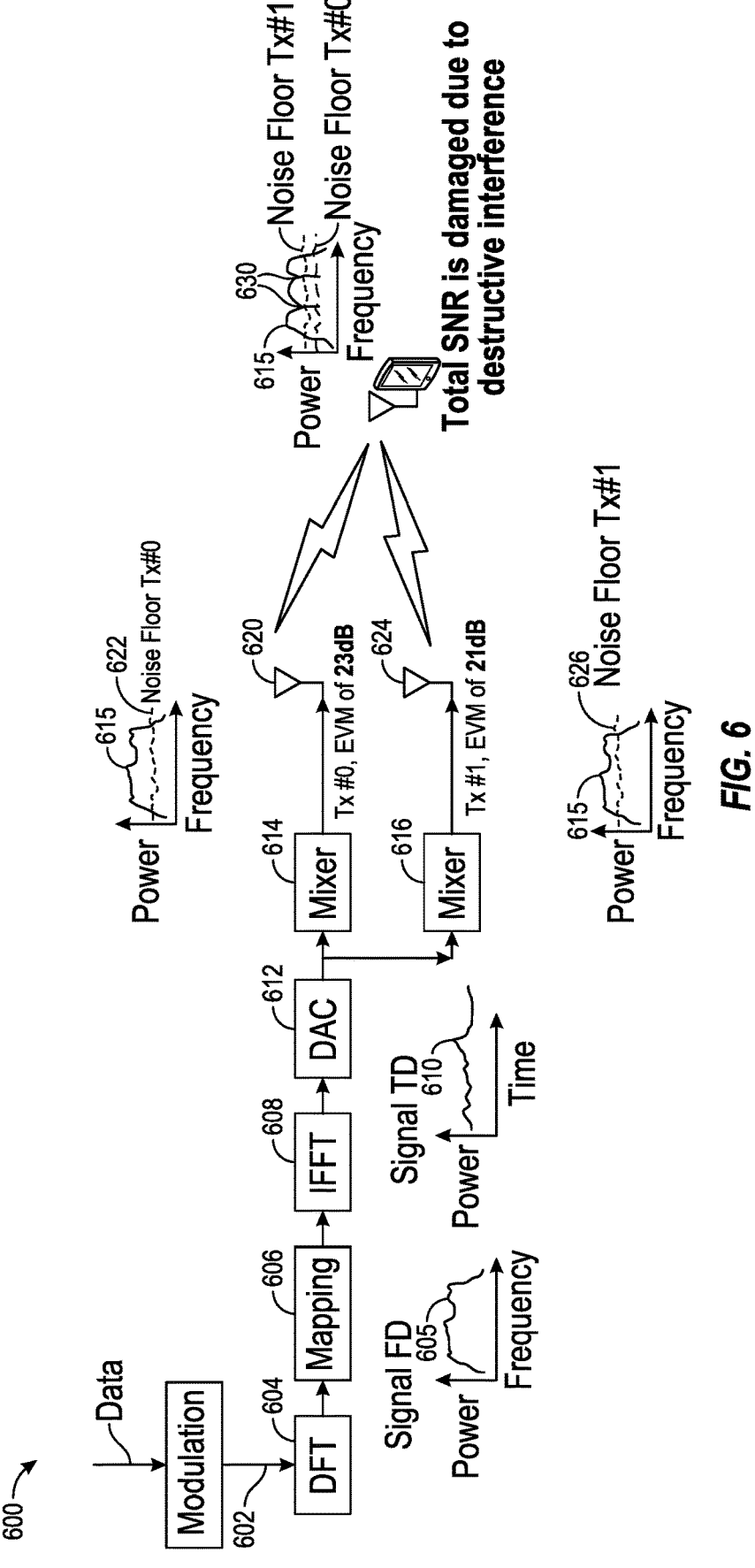
FIG. 6 illustrates various components of a transmitter front-end of a transmitter that may be used to transmit a same layer via multiple antenna elements.

For example, FIG. 6 illustrates various components of a transmitter front-end 600 of a transmitter. As shown, a modulated time-domain signal 602 may be provided to a Discrete Fourier Transform (DFT) block 604. The DFT block 604 is configured to convert the time-domain signal 602 into an equivalent frequency-domain signal 605 including a plurality of complex-valued frequency-domain samples. Thereafter, a mapper 606 may be used to map the complex-valued frequency-domain samples of the frequency-domain signal 605 generated by the DFT onto a set of constellation points. This mapping process is known as Quadrature Amplitude Modulation (QAM) and is used to represent the information being transmitted by the signal.

Thereafter, the frequency-domain signal may be provided to an Inverse Fast Fourier Transform (IFFT) block 608 is used to convert the frequency-domain signal 605, which has been generated by the DFT and mapped to a set of constellation points, into a time-domain signal 610 for transmission over a wireless channel. After the IFFT block 608, the time-domain signal 610 is provided to a digital-to-analog converter (DAC) 612, which converts the (digital) time-domain signal 610 signal into an analog signal 615 that can be transmitted over the wireless channel. Thereafter, the analog signal 615 (e.g., which corresponds to a same layer) may be provided to the mixer 614 and the mixer 616.

The mixer 614 and mixer 616 are configured to provide the analog signal 615 to a first antenna element 620 and a second antenna element 624, respectively, for transmission to a receiver. As shown, transmission of the analog signal 615 via the first antenna element 620 may be associated with a first EVM (e.g., 23 dB) and first noise floor 622. Similarly, transmission of the analog signal 615 via the second antenna element 624 may be associated with a second EVM (e.g., 21 dB) and a second noise floor 626.

In some cases, transmitting the analog signal 615 using multiple antennas (e.g., the first antenna element 620 and second antenna element 624) may have a potential of up to a 3 dB gain. For example, transmitting the analog signal 615 from multiple antenna elements or panels may potentially increase a signal power by 6 dB (in coherent summation) and noise will be increased only by 3 dB (as the noise is not summed coherently), resulting in the potential gain of 3 dB. However, transmitting the same analog signal 615 via multiple antennas may have the potential to cause destructive interference in the analog signal 615 which may damage SNR, as shown at 630, at the receiver and cause the analog signal 615 to not be properly received or decoded by the receiver.

Figure 7:
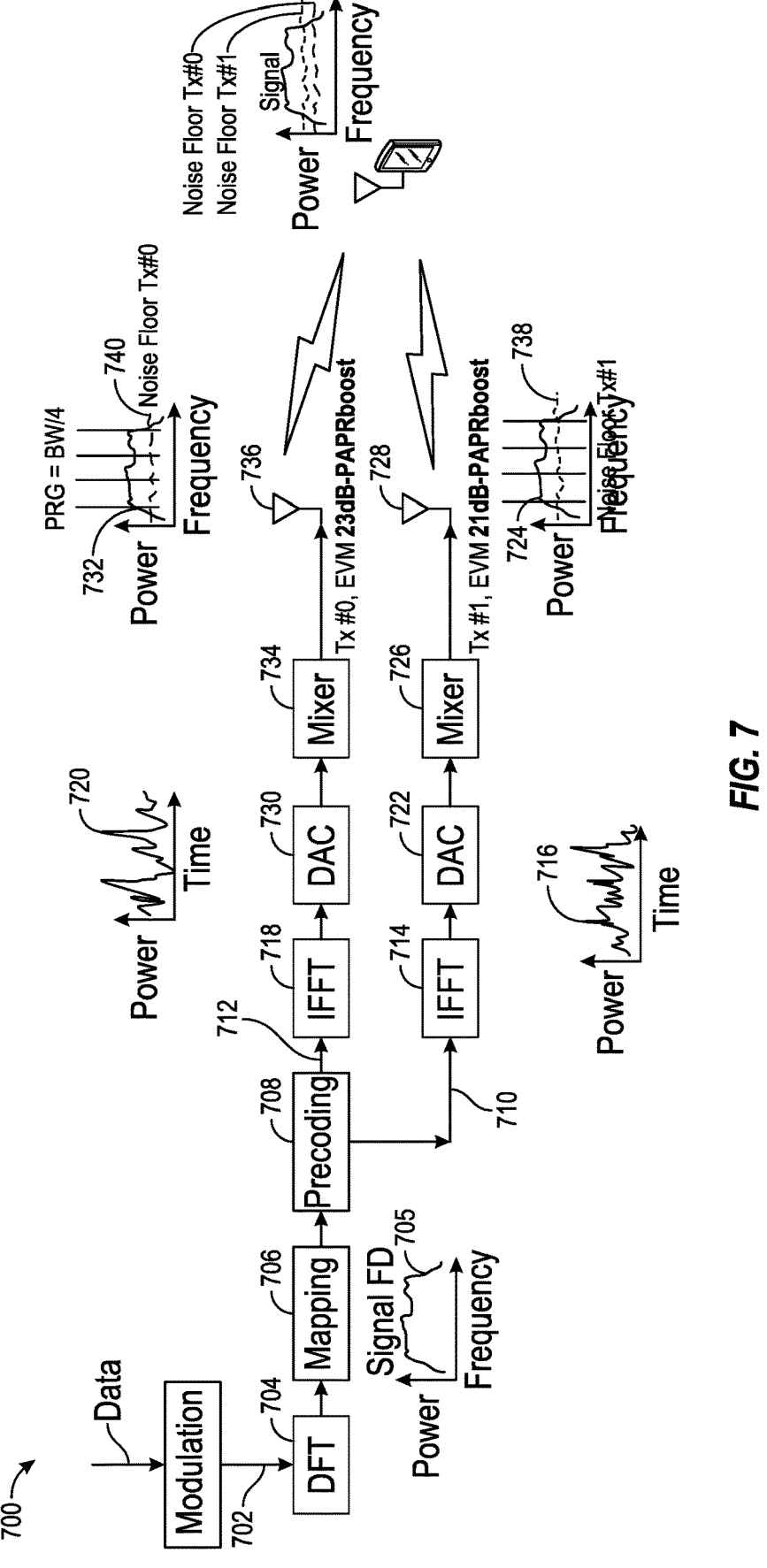
FIG. 7 illustrates various components of a transmitter front-end of a transmitter that may be used to perform PRG-based precoding.

In some cases, another method that may be used to reduce EVM distortion while avoiding the destructive interference described above may involve using precoding. For example, in some cases, singular value decomposition (SVD) precoding or another type of precoding to maximize channel capacity may be used with wideband (WB) precoding and/or narrowband (NB) precoding. When SVD is used, an overall bandwidth for transmitting a signal may be divided into multiple Precoding Resource Groups (PRGs), and each PRG is precoded using a different precoding matrix. When PRG-based precoding is used, destructive interference may not occur; however, a PAPR of the transmitted signal may be damaged and the overall received SNR at the receiver may not improve. FIG. 7 provides an illustration of this precoding.

For example, FIG. 7 illustrates various components of a transmitter front-end 700 of a transmitter that may be used to perform PRG-based precoding. As shown, a modulated time-domain signal 702 may be provided to a DFT block 704. The DFT block 704 is configured to convert the time-domain signal 702 into an equivalent frequency-domain signal 705 including a plurality of complex-valued frequency-domain samples. Thereafter, a mapper 706 may be used to map the complex-valued frequency-domain samples of the frequency-domain signal 705 generated by the DFT onto a set of constellation points. As noted above, this mapping process is known as QAM and is used to represent the information being transmitted by the signal.

Thereafter, the frequency-domain signal 705 may be provided to a precoding block 708 for PRG-based precoding. The precoding block 708 may be configured to precode the frequency-domain signal 705 using different precoders and output a plurality of differently precoded frequency-domain signals. For example, the precoding block 708 may split an available bandwidth associated with the frequency-domain signal 705 into a plurality of different PRGs. In the example of FIG. 7, the available bandwidth may be split into four PRGs having a size equal to PRG=bandwidth/4. The precoding block 708 may then use different precoders to precode the PRGs of the frequency-domain signal 705 differently, resulting in differently precoded frequency-domain signals, such as a first precoded frequency-domain signal 710 and a second precoded frequency-domain signal 712. As shown, the first precoded frequency-domain signal 710 corresponds to a first antenna element 728 of the transmitter and the second precoded frequency-domain signal 712 correspond to a second antenna element 736 of the transmitter.

Thereafter, the first precoded frequency-domain signal 710 may be provided to a first IFFT block 714 to convert the first precoded frequency-domain signal 710 into a first time-domain signal 716 for transmission over a wireless channel. Similarly, the second precoded frequency-domain signal 712 may be provided to a second IFFT block 718 to convert the second precoded frequency-domain signal 712 into a second time-domain signal 720 for transmission over the wireless channel. As can be seen in FIG. 7, because the first precoded frequency-domain signal 710 and the second precoded frequency-domain signal 712 each include PRGs that have been precoded differently, the first time-domain signal 716 and the second time-domain signal 720 are different and each have higher PAPRs relative to a case in which PRG-based precoding is not performed on the frequency-domain signal 705.

After the first IFFT block 714, the first time-domain signal 716 is provided to a first DAC 722, which converts the (digital) first time-domain signal 716 into a first analog signal 724 for transmission over the wireless channel. Thereafter, the first analog signal 724 may be provided to a first mixer 726 and transmitted via a first antenna element 728. Similarly, after the second IFFT block 718, the second time-domain signal 720 is provided to a second DAC 730, which converts the (digital) second time-domain signal 720 into a second analog signal 732 for transmission over the wireless channel. Thereafter, the second analog signal 732 may be provided to a second mixer 734 and transmitted via a second antenna element 736.

As shown, transmission of the first analog signal 724 via the first antenna element 728 may be associated with a first EVM (e.g., 21 dB) and first noise floor 738. Similarly, transmission of the second analog signal 732 via the second antenna element 736 may be associated with a second EVM (e.g., 23 dB) and a second noise floor 740. In some cases, PRG-based precoding may provide up to a 3 dB gain in SNR associated with the transmission of the first analog signal 724 and the second analog signal 732. However, this gain may be offset by the increase in PAPR associated with the first analog signal 724 and the second analog signal 732. For example, because the first analog signal 724 and the second analog signal 732 each include the full bandwidth of the frequency-domain signal 705, the summation of the first analog signal 724 and the second analog signal 732 when transmitted by the transmitter increases the PAPR. For example, the increase in the PAPR may cause a reduction in SNR of 1-3 dB, effectively canceling the increase in gain due to the PRG-based precoding. An increase in the PAPR may cause higher distortion in a power amplifier (PA) of the transmitter. This distortion may be avoided, in some cases, by reducing the PA input power but with the cost of reducing output power and increased EVM (e.g., a signal power is reduced but a noise power remains the same).

Aspects Related to Multi-Allocation Precoding

Accordingly, aspects of the present disclosure provide techniques for reducing EVM distortion associated with high bandwidth, high power transmissions in transmitters that may be noise limited. In some cases, these techniques may improve PSD associated with these transmissions without impacting (e.g., increasing) PAPR. As a result, an SNR gain at a receiver may be improved without the offsetting effects associated with an increased PAPR.

In some cases, these techniques may involve a transmitter (e.g., a base station, UE, etc.) performing multi-allocation precoding on a signal for transmission, such that different antenna elements of the transmitter are allocated different frequency portions of an overall bandwidth of the signal. For example, unlike the PRG-based precoding techniques described in FIG. 7 in which each antenna element of the transmitter is configured to transmit analog signals encompassing the full bandwidth of an original frequency-domain signal (e.g., frequency-domain signal 705), the techniques for multi-allocation precoding may involve precoding different portions of a modulated signal using different precoders to obtain a first plurality of differently precoded signals. In some cases, due to the multi-allocation precoding, each differently precoded signal of the first plurality of differently precoded signals may include a different, non-overlapping portion of the modulated signal. In other words, each antenna element of the transmitter may only transmit a (different) portion of the modulated signal. Additional details regarding multi-allocation precoding will be described with respect to FIG. 8.

In some cases, multi-allocation precoding may be used with different types of waveforms, such as DFT spread orthogonal frequency division multiplexing (DFT-s-OFDM) waveform, which is a main candidate for future wireless communication standards (e.g., sixth generation (6G) and beyond). In some cases, using multi-allocation precoding that includes part of the allocation for signals having these types of waveforms may not impact PAPR of these signals and may improve the PSD of these signals, causing EVM to improve (e.g., whereas other precoding techniques, such as SVD, may damage the signal PAPR and, thereby, the EVM). Further, because EVM is improved by using multi-allocation precoding, throughput may also be increased (e.g., since when EVM is improved, an ENOB may be increased).

Figure 8:
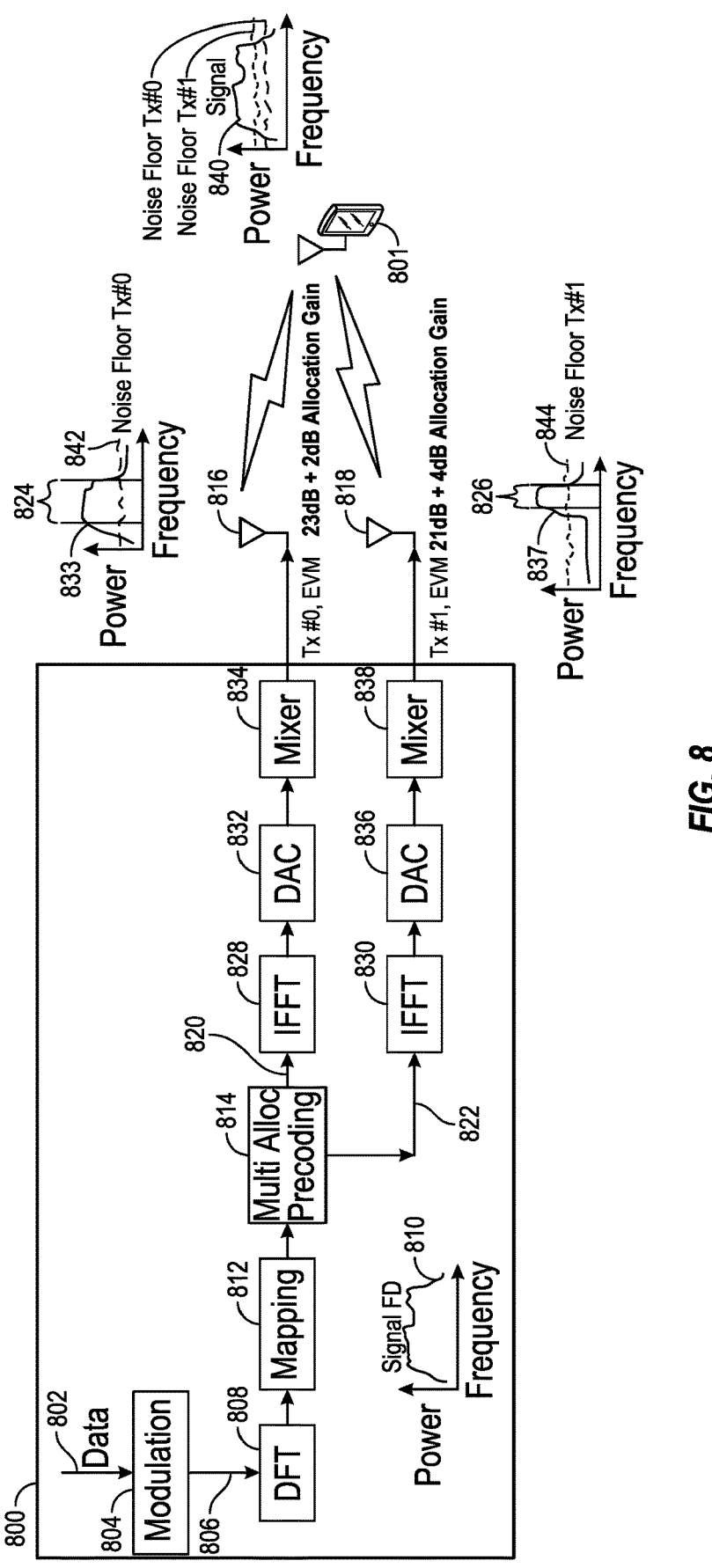
FIG. 8 illustrates various components of a transmitter front-end of a transmitter that may be used to perform multi-allocation precoding.

For example, FIG. 8 illustrates various components of a transmitter front-end of a transmitter 800 that may be used to perform multi-allocation precoding for transmitting signals to a receiver 801. In some cases, the transmitter 800 may be an example of a network entity, such as BS 102 depicted and described with respect to FIGS. 1 and 3 or a disaggregated base station depicted and described with respect to FIG. 2. In some cases, the transmitter 800 may be an example of a user equipment, such as UE 104 depicted and described with respect to FIGS. 1 and 3. Likewise, the receiver 801 may be an example of a network entity, such as BS 102 depicted and described with respect to FIGS. 1 and 3 or a disaggregated base station depicted and described with respect to FIG. 2. In some cases, the receiver 801 may be an example of a user equipment, such as UE 104 depicted and described with respect to FIGS. 1 and 3.

As illustrated, data 802 for transmission may be modulated by a modulator 804. A first modulated signal 806 may then be output by the modulator 804 as a time-domain signal and provided to a DFT block 808.

The DFT block 808 is configured to convert the first modulated signal 806 into an equivalent frequency-domain signal 810 including a plurality of complex-valued frequency-domain samples. Thereafter, a mapper 706 may be used to map the complex-valued frequency-domain samples of the frequency-domain signal 705 generated by the DFT onto a set of constellation points, similar to as described above with respect to FIGS. 6 and 7.

Thereafter, the equivalent frequency-domain signal 810 of the first modulated signal 806 may be provided to a precoding block 814 for multi-allocation precoding. For example, in order to perform the multi-allocation precoding, the precoding block 814 may be configured to precode different portions of the frequency-domain signal 810 using different precoders to obtain a first plurality of differently precoded signals. In some cases, each differently precoded signal of the first plurality of differently precoded signals may correspond to a respective different portion of the different portions of the first modulated signal. Additionally, each differently precoded signal of the first plurality of differently precoded signals may correspond to a different antenna element of a first plurality of antenna elements of the transmitter 800. In some cases, each differently precoded signal of the first plurality of differently precoded signals may correspond to a different antenna panel of a first plurality of antenna panels of the transmitter 800.

As an example, assuming that the transmitter 800 includes two antenna elements, to perform the multi-allocation precoding, the transmitter 800 may apply a precoding matrix, such as the precoding matrix illustrated in Table 1, below, to the frequency-domain signal 810.

TABLE 1

| Example Multi-Allocation Precoding Matrix | |
|---|---|
| 1 | 0 |
| 1 | 0 |
| 1 | 0 |
| 1 | 0 |
| 0 | 1 |
| 0 | 1 |

Each column in the example multi-allocation precoding matrix in Table 1 may include a different precoder corresponding to a different antenna element or antenna port of the transmitter 800. For example, the first column of the example multi-allocation precoding matrix in Table 1 may correspond with a first antenna element 816 (e.g., TX #0) while the second column of the example multi-allocation precoding matrix in Table 1 may correspond with a second antenna element 818 (e.g., TX #1). Additionally, each row of the example multi-allocation precoding matrix in Table 1 may correspond to a different subchannel within a bandwidth of the frequency-domain signal 810.

In some cases, each precoder included within the example multi-allocation precoding matrix in Table 1 may effectively allocate different portions (e.g., subchannels) of the frequency-domain signal 810 to different antenna elements (e.g., the first antenna element 816 or the second antenna element 818). For example, a number one included within a precoder may indicate that a corresponding subchannel within the bandwidth of the frequency-domain signal 810 is allocated to a particular antenna element while a number zero included within a precoder may indicate that a corresponding subchannel within the bandwidth of the frequency-domain signal 810 is not allocated to that particular antenna element.

For example, as shown, a first precoder included in the first column of the multi-allocation precoding matrix in Table 1 (e.g., corresponding to the first antenna element 816) indicates a first portion 824 or first allocation of subchannels of the frequency-domain signal 810 represented by four ones followed by two zeros. The ones included in the first four rows of the first column of the example multi-allocation precoding matrix in Table 1 may indicate that subchannels 1, 2, 3, and 4 of the frequency-domain signal 810 are allocated to the first antenna element 816 while the zeros included in the last two rows of the first column indicate that subchannels 5 and 6 are not allocated to the first antenna element 816.

Similarly, as shown, a second precoder included in the second column of the multi-allocation precoding matrix in Table 1 (e.g., corresponding to the second antenna element 818) indicates a second portion 826 or allocation of subchannels of the frequency-domain signal 810 represented by four zeros followed by two ones. The ones included in the last two rows of the second column of the example multi-allocation precoding matrix in Table 1 may indicate that subchannels 5 and 6 of the frequency-domain signal 810 are allocated to the second antenna element 818 while the zeros included in the first four rows of the second column indicate that subchannels 1, 2, 3, and 4 are not allocated to the second antenna element 818.

Accordingly, when performing the multi-allocation precoding in the precoding block 814, the transmitter 800 may be configured to apply the first precoder to the frequency-domain signal 810 to obtain a first precoded signal 820 of the first plurality of differently precoded signals corresponding to a first portion of the frequency-domain signal 810 and to the first antenna element 816. The transmitter 800 may also be configured to apply the second precoder to the frequency-domain signal 810 to obtain a second precoded signal 822 of the first plurality of differently precoded signals corresponding to a second portion of the frequency-domain signal 810 and to the second antenna element 818.

In some cases, applying the first precoder to the frequency-domain signal 810 removes portions of the frequency-domain signal 810, from the first precoded signal 820, other than the first portion of the frequency-domain signal 810 (e.g., including at least the second portion of the frequency-domain signal 810). For example, based on Table 1, above, the first portion of the frequency-domain signal 810 may correspond to subchannels 1, 2, 3, and 4. As such, applying the first precoder to the frequency-domain signal 810 may remove subchannels 5 and 6 of the frequency-domain signal 810 (e.g., corresponding to the second portion) from the first precoded signal 820. In some cases, removing subchannels 5 and 6 of the frequency-domain signal 810 (e.g., corresponding to the second portion) from the first precoded signal 820 may comprise setting a transmission power associated with these subchannels to zero, such that the second antenna element 818 does not transmit these subchannels. As a result, the first precoded signal 820 may only include subchannels 1, 2, 3, and 4 of the frequency-domain signal 810.

Similarly, applying the second precoder to the frequency-domain signal 810 removes portions of the frequency-domain signal 810, from the second precoded signal 822, other than the second portion of the frequency-domain signal 810 (e.g., including at least the first portion of the first modulated signal). For example, based on Table 1, above, the second portion of the frequency-domain signal 810 may correspond to subchannels 5 and 6. As such, applying the second precoder to the frequency-domain signal 810 may remove subchannels 1, 2, 3, and 4 of the frequency-domain signal 810 (e.g., corresponding to the first portion) from the second precoded signal 822. In some cases, removing subchannels 1, 2, 3, and 4 of the frequency-domain signal 810 (e.g., corresponding to the first portion) from the second precoded signal 822 may comprise setting a transmission power associated with these subchannels to zero, such that the second antenna element 818 does not transmit these subchannels. As a result, the second precoded signal 822 may only include subchannels 5 and 6 of the frequency-domain signal 810.

As noted above, each precoder included within the example multi-allocation precoding matrix in Table 1 may allocate different portions (e.g., subchannels) of the frequency-domain signal 810 to different antenna elements (e.g., the first antenna element 816 or the second antenna element 818). In some cases, the transmitter 800 may determine the allocation of (e.g., precoder that allocates) the different portions of the frequency-domain signal 810 to the different antenna elements based on at least one of a link capacity between the transmitter 800 and receiver 801. In some cases, the transmitter 800 may determine the allocation of (e.g., precoder that allocates) the different portions of the frequency-domain signal 810 to the different antenna elements based on an EVM associated with each of the different antenna elements. In some cases, the transmitter 800 may determine the allocation of (e.g., precoder that allocates) the different portions of the frequency-domain signal 810 to the different antenna elements based on a machine learning algorithm.

As shown in FIG. 8, after performing the multi-allocation precoding in the precoding block 814, the first precoded signal may be provided to a first IFFT block 828, which is configured to convert the first precoded (frequency-domain) signal 820 into a first time-domain signal for transmission over a wireless channel. Similarly, the second precoded signal 822 may be provided to a second IFFT block 830, which is configured to convert the second precoded (frequency-domain) signal 822 into a second time-domain signal for transmission over the wireless channel.

After the first IFFT block 828, the first time-domain signal is provided to a first DAC 832, which converts the (digital) first time-domain signal into a first analog signal 833 for transmission over the wireless channel. Thereafter, the first analog signal 833 may be provided to a first mixer 834 and transmitted via the first antenna element 816. Similarly, after the second IFFT block 830, the second time-domain signal is provided to a second DAC 836, which converts the (digital) second time-domain signal into a second analog signal 837 for transmission over the wireless channel. Thereafter, the second analog signal 837 may be provided to a second mixer 838 and transmitted via a second antenna element 818.

Due to the multi-allocation precoding, the first analog signal 833 and the second analog signal 837 each include a different portion of the (modulated) frequency-domain signal 810. For example, the first analog signal 833 includes the first portion 824 of the frequency-domain signal 810 while the second analog signal 837 includes the second portion 826 of the frequency-domain signal 810, as described above. Accordingly, together, the first analog signal 833 and second analog signal 837 may comprise an entire bandwidth of the frequency-domain signal 810. As such, the receiver 801 may receive and combine the first analog signal 833 and the second analog signal 837 to obtain the full-bandwidth (modulated) frequency-domain signal 810, as shown at 840. Thereafter, the receiver 801 may demodulate the frequency-domain signal 810 to obtain the data 802. These techniques related to the receiver 801 are simplified and it should be understood that the receiver 801 may perform additional steps when processing transmissions received from the transmitter 800. In general, the receiver 801 may perform steps that are opposite to the steps described above with respect to the transmitter 800.

As shown, transmission of the first analog signal 833 via the first antenna element 816 may be associated with a first EVM (e.g., 23 dB) and first noise floor 842. Similarly, transmission of the second analog signal 837 via the second antenna element 818 may be associated with a second EVM (e.g., 21 dB) and a second noise floor 844. In some cases, due to the multi-allocation precoding, a PSD of the first analog signal 833 may be improved since the first analog signal 833 only includes the first portion 824 of the frequency-domain signal 810, thereby improving EVM associated with the first antenna element 816. Similarly, a PSD of the second analog signal 837 may be improved since the second analog signal 837 only includes the second portion 826 of the frequency-domain signal 810, thereby improving EVM associated with the second antenna element 818.

As a result, the multi-allocation precoding may provide an increase in gain in SNR (e.g., 2 dB) associated with transmission of the first analog signal 833 via the first antenna element 816. Similarly, the multi-allocation precoding may provide an increase in gain in SNR (e.g., 4 dB) associated with transmission of the second analog signal 837 via the second antenna element 818. Accordingly, in the example shown in FIG. 8, the receiver 801 may experience a gain in SNR of 3 dB (e.g., on average) due to the multi-allocation precoding performed by the transmitter 800.

Further, unlike the PRG-based precoding described with respect to FIG. 7 in which an overall PAPR increased since each of the first analog signal 724 and second analog signal 732 includes the entire bandwidth of the frequency-domain signal 705, the multi-allocation precoding described with respect to FIG. 8 may leave an overall PAPR associated with the transmission of the first analog signal 833 and the second analog signal 837 relatively unchanged. For example, the overall PAPR may remain relatively unchanged when multi-allocation precoding is used because the first analog signal 833 transmitted via the first antenna element 816 only includes the first portion 824 of the frequency-domain signal 810 and because the second analog signal 837 transmitted via the second antenna element 818 only includes the second portion 826 of the frequency-domain signal 810. In other words, the overall PAPR may remain relatively unchanged since the entire bandwidth of the frequency-domain signal 810 is not duplicatively transmitted via both of the first analog signal 833 and second analog signal 837 and, as such, there is no summation of two signals having a same bandwidth which would increase PAPR like described above with respect to FIG. 7. Accordingly, because the overall PAPR remains relatively unchanged, the gain provided by multi-allocation precoding (e.g., on average 3 dB) is not canceled out or offset like it is with SVD precoding or PRG-based precoding described above with respect to FIG. 7.

Example Operations for Configuring and Using
Multi-Allocation Precoding

Figure 9:
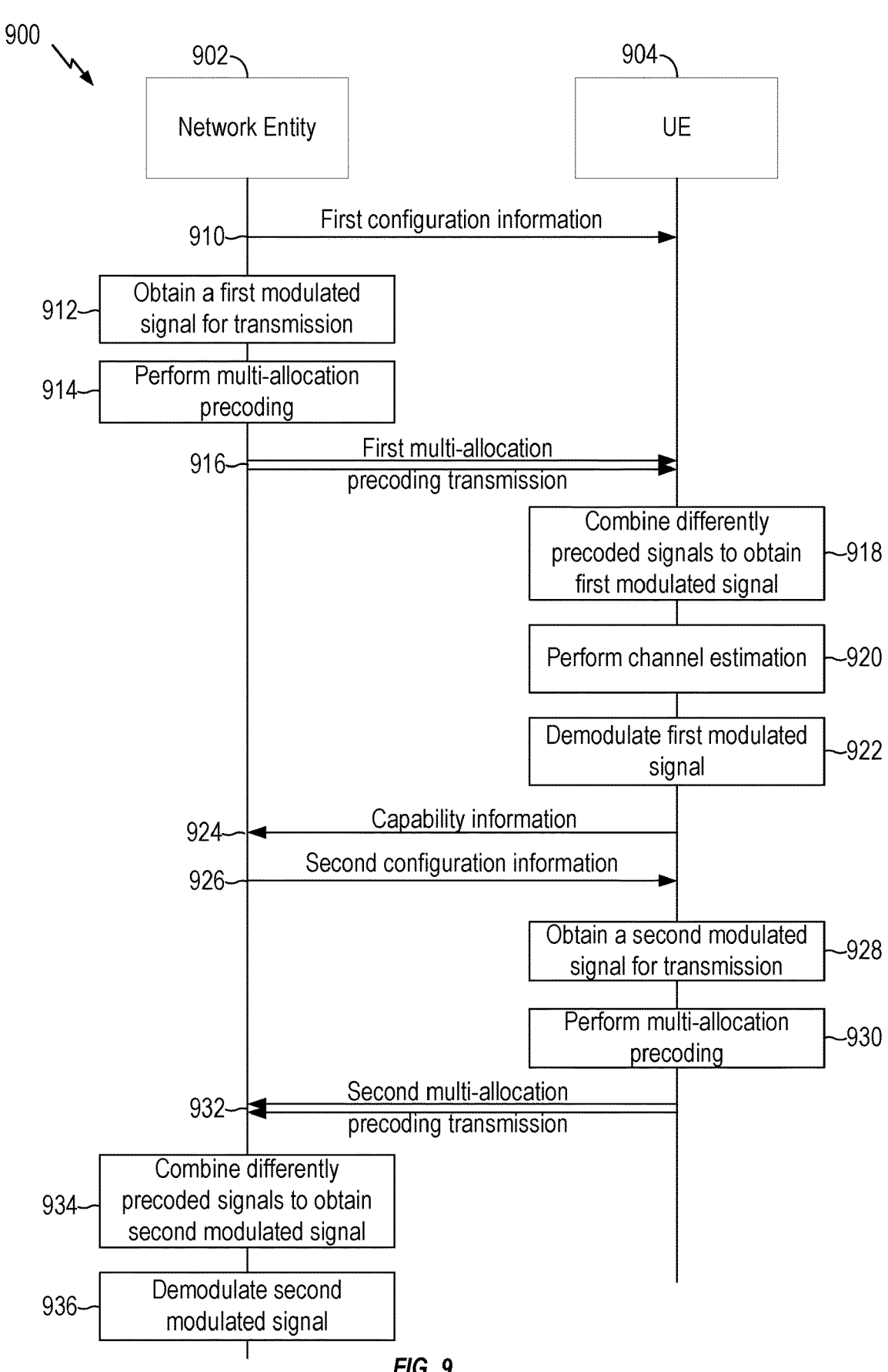
FIG. 9 depicts a process flow including operations for communications in a network between a network entity and a user equipment.

FIG. 9 depicts a process flow including operations 900 for communications in a network between a network entity 902 and a user equipment (UE) 904 for configuring and using multi-allocation precoding. In some aspects, the network entity 902 may be an example of the BS 102 depicted and described with respect to FIGS. 1 and 3 or a disaggregated base station depicted and described with respect to FIG. 2. Similarly, the UE 904 may be an example of UE 104 depicted and described with respect to FIGS. 1 and 3. However, in other aspects, UE 104 may be another type of wireless communications device and BS 102 may be another type of network entity or network node, such as those described herein.

As shown, operations 900 begin in step 910 with the network entity 902 transmitting first configuration information to the UE 904. The first configuration information may configure the UE 904 to receive at least a first multi-allocation precoding transmission that includes a plurality of differently precoded signals. In some cases, the network entity 902 may determine to use multi-allocation precoding based on channel conditions between the network entity 902 and UE 904. For example, if channel conditions are poor (e.g., reference signal received power (RSRP) is below a threshold), the network entity 902 may decide to use multi-allocation precoding and, as a result, transmit the first configuration information to the UE 904 configuring the UE to receive at least the first multi-allocation precoding transmission. In some cases, the network entity 902 may transmit the first configuration information using a media access control-control element (MAC-CE) message, a radio resource control (RRC) message, downlink control information (DCI). In some cases, the network entity 902 may transmit the configuration information, configuring the UE 904 to receive multi-allocation precoding transmissions, in an aperiodic or periodic manner.

In some cases, the first multi-allocation precoding transmission may be transmitted by the network entity 902 using a first plurality of antenna elements (e.g., the first antenna element 816 and second antenna element 818 illustrated in FIG. 8) or a first plurality of antenna panels. In some cases, the first multi-allocation precoding transmission may be transmitted using a DFT spread orthogonal frequency division multiplexing (DFT-s-OFDM) waveform.

In some cases, the first configuration information comprises a number of antenna elements of the first plurality of antenna elements used to transmit the first multi-allocation precoding transmission. In some cases, the first configuration information comprises information indicating an allocation of different portions of the first modulated signal to the different antenna elements of the network entity 902. For example, with reference to FIG. 8, the first configuration information may indicate that the first portion 824 of the frequency-domain signal 810 is allocated to the first antenna element 816 for transmission in the first analog signal 833 and that the second portion 826 of the frequency-domain signal 810 is allocated to the second antenna element 818 for transmission in the second analog signal 837.

In some cases, the allocation may be indicated using, for example, a bitmap of a full bandwidth to be used for transmitting the first modulated signal. For example, the bitmap may include a plurality of bits, each bit corresponding to a different portion of the full bandwidth of the first modulated signal and indicating which antenna element of the first plurality of antenna element that that different portion is allocated to. For example, with reference to FIG. 8, the bitmap may include a bit corresponding to the first portion 824 and may be set to indicate that the first portion 824 is allocated to the first antenna element 816. Similarly, the bitmap may include another bit corresponding to the second portion 826 and may be set to indicate that the second portion 826 is allocated to the second antenna element 818.

In some cases, the allocation may be indicated using a pre-defined look up table (LUT) that indicates different allocations of the different portions of the first modulated signal to antenna elements in the first plurality of antenna elements depending, for example, on a number of antenna elements in the first plurality of antenna elements.

In some cases, EVM associated with the network entity 902 may be based on manufacturer calibration. For example, in some cases, a manufacturer of the network entity 902 may estimate EVM of network entity 902 under different operating scenarios. The estimated EVM may be stored in a LUT and used by the network entity 902 to determine the allocation of the different portions of the first modulated signal to the different antenna elements of the network entity 902.

In some cases, the first configuration information comprises an indication of a number of layers used for transmitting the first multi-allocation precoding transmission per antenna element of the first plurality of antenna elements. For example, in some cases, the first configuration information may indicate that one layer will be transmitted using the first plurality of antenna elements. In some cases, the number of layers used to transmit the first multi-allocation precoding transmission may be less than a total number of antenna elements in the first plurality of antenna elements.

In some cases, the first configuration information comprises an indication of one or more demodulation reference signal (DMRS) associated with each antenna element of the first plurality of antenna elements. In some cases, the first configuration information may include an indication of an antenna port that indicates a number of layers used for transmitting the first multi-allocation precoding transmission.

Additionally, in some cases, EVM may be affected by channel conditions and the temperature of certain components of a transmitter front end (e.g., the transmitter front-end illustrated in FIG. 8), the first configuration information may depend on at least one of channel conditions between the network entity 902 and UE 904 or a temperature associated with one or more components of the network entity 902, including the first plurality of antenna elements.

After transmitting the first configuration information, the network entity 902 may obtain, in step 912, a first modulated signal for transmission. The first modulated signal may include data (e.g., user data or control information) intended for the UE 904.

Thereafter, in step 914, the network entity 902 may perform multi-allocation precoding on the first modulated signal to obtain the first multi-allocation precoding transmission. In some cases, the network entity 902 may perform the multi-allocation precoding in accordance with the first configuration information transmitted to the UE 904 in step 910. In some cases, the multi-allocation precoding may be performed using the techniques described above with respect to FIG. 8.

For example, in some cases, performing multi-allocation precoding on the first modulated signal may comprise precoding different portions of the first modulated signal using different precoders to obtain a first plurality of differently precoded signals. In some cases, each differently precoded signal of the first plurality of differently precoded signals may correspond to a respective different portion of the different portions of the first modulated signal. Additionally, in some cases, each differently precoded signal of the first plurality of differently precoded signals may correspond to a different antenna element of the first plurality of antenna elements of the network entity 902. In some cases, each differently precoded signal of the first plurality of differently precoded signals may correspond to a different antenna panel of a first plurality of antenna panels of the network entity 902

In some cases, each different precoder may effectively allocate a different portion of the first modulated signal to a respective different antenna element of the first plurality of antenna elements for transmission. In some cases, the network entity 902 may determining the allocation of the different portions of the first modulated signal to the different antenna elements of the network entity 902 based on at least one of a link capacity between the network entity and UE and an error vector magnitude (EVM) associated with the network entity or a machine learning algorithm. Additional details regarding these different precoders and how they allocate different portions of a signal to different antenna elements are described with respect to Table 1 and FIG. 8, above.

In some cases, precoding the different portions of the first modulated signal using different precoders in step may include, for example, applying a first precoder (e.g., first column of Table 1) to the first modulated signal (e.g., frequency-domain signal 810 illustrated in FIG. 8) to obtain a first differently precoded signal (e.g., first precoded signal 820 illustrated in FIG. 8) of the first plurality of differently precoded signals corresponding to a first portion (e.g., first portion 824 illustrated in FIG. 8) of the first modulated signal and to a first antenna element (e.g., first antenna element 816 illustrated in FIG. 8) of the first plurality of antenna elements. Additionally, the network entity 902 may apply a second precoder (e.g., second column of Table 1) to the first modulated signal (e.g., frequency-domain signal 810 illustrated in FIG. 8) to obtain a second differently precoded signal (e.g., second precoded signal 822 illustrated in FIG. 8) of the first plurality of differently precoded signals corresponding to a second portion (e.g., second portion 826 illustrated in FIG. 8) of the first modulated signal and to a second antenna element (e.g., second antenna element 818 illustrated in FIG. 8) of the first plurality of antenna elements.

As described above, in order to improve EVM associated with the first plurality of antenna elements, applying the different precoders to the first modulated signal may be used to "zero out" portions of the first modulated signal from the differently precoded signals while keeping certain desired portions. For example, applying the first precoder to the first modulated signal may remove portions of the first modulated signal, from the first differently precoded signal, other than the first portion of the first modulated signal. For example, applying the first precoder to the first modulated signal may remove at least the second portion of the first modulated signal, leaving only the first portion of the first modulated signal in first differently precoded signal. In some cases, to remove the other portions of the first modulated signal other than the first portion from the first differently precoded signal, the network entity 902 is configured to reduce, based on the first precoder, a transmission power associated with these other portions to zero.

Likewise, applying the second precoder to the first modulated signal removes portions of the first modulated signal, from the second differently precoded signal, other than the second portion of the first modulated signal. For example, applying the second precoder to the first modulated signal may remove at least the first portion of the first modulated signal, leaving only the second portion of the first modulated signal in second differently precoded signal. In some cases, to remove the other portions of the first modulated signal other than the second portion from the second differently precoded signal, the network entity 902 is configured to reduce, based on the second precoder, a transmission power associated with these other portions to zero.

In step 916, after performing the multi-allocation precoding, the transmitter may transmit, the UE 904, the first multi-allocation precoding transmission, including the plurality of differently precoded signals, using the first plurality of antenna elements. In some cases, transmitting the first multi-allocation precoding transmission comprises transmitting each differently precoded signal of the first plurality of differently precoded signals using the different antenna element, of the first plurality of antenna elements, corresponding to that differently precoded signal.

As discussed above, each of the differently precoded signals may include a different portion of the first modulated signal. Accordingly, after receiving the first plurality of differently precoded signals, the UE 904 may combine the first plurality of differently precoded signals to obtain the first modulated signal, as shown in step 918.

In some cases, in order to properly demodulate the first modulated signal, the UE 904 may need to perform a channel estimation procedure to estimate a channel between the UE 904 and network entity 902. To avoid channel estimation errors when multi-allocation precoding is used to transmit information to the UE 904, the UE 904 may configure a channel estimation, used by the UE 904 to estimate a channel between the UE 904 and network entity 902, to operate based on the different portions/allocations of the first modulated signal included within each of the differently precoded signals of the first plurality of differently precoded signals.

Accordingly, for example, as shown in step 920, the UE 904 may perform separate channel estimation measurements for each differently precoded signal in the first plurality of differently precoded signals. For example, as noted above, the first multi-allocation precoding transmission may include the first plurality of differently precoded signals, such as the first differently precoded signal and the second differently precoded signal discussed above. Additionally, as noted above, the first differently precoded signal may include the first portion of the first modulated signal while the second differently precoded signal may include the second portion of the first modulated signal.

Accordingly to perform the channel estimation procedure, the UE 904 may perform channel estimation measurements for the first differently precoded signal based on the first portion of the first modulated signal allocated to the first differently precoded signal and may also perform channel estimation measurements for the second differently precoded signal based on the second portion of the first modulated signal allocated to the second differently precoded signal. For example, for the first differently precoded signal, the UE 904 may perform the channel estimation measurements over a first number of subchannels/RBs/bandwidth corresponding to the first portion of the first modulated signal (e.g., rather than performing the channel estimation measurements over a full bandwidth of the first modulated signal). Further, for the second differently precoded signal, the UE 904 may perform the channel estimation measurements over a second number of subchannels/RBs/bandwidth corresponding to the second portion of the first modulated signal (e.g., rather than performing the channel estimation measurements over a full bandwidth of the first modulated signal).

In some cases, the channel estimation procedure configured and used by the UE 904 with multi-allocation precoding may be different from a channel estimation procedure associated with PRG-based precoding. For example, a channel estimation procedure used with PRG-based precoding may only have a limited number of options (e.g., 2 resource block (RBs), 4 RBs, WB, etc.) and may only be able to function based on a constant PRG size. In contrast, when multi-allocation precoding is used, the different portions/allocations (e.g., subchannels/RBs) associated with the differently precoded signals may be different sizes based on, for example, EVM associated with each antenna element of the first plurality of antenna elements of the network entity 902.

As shown in step 922, after combining the first plurality of differently precoded signals to obtain the first modulated signal, the UE 904 may then demodulate the first modulated signal. In some cases, demodulating the first modulated signal may be based on the channel estimation measurements described above.

In some cases, the UE 904 may also be configured to use multi-allocation precoding when transmitting uplink signals to the network entity 902. In some cases, the UE 904 may need to be configured by the network entity 902 to use multi-allocation precoding, which may be based on capability information associated with the UE 904. For example, as shown in step 924, the UE 904 may transmit capability information to the network entity 902. In some cases, the capability information transmitted to the network entity 902 may indicate a number of antenna elements of the UE 904 that are capable of multi-allocation precoding. Additionally, in some cases, the capability information may also indicate a respective EVM for each antenna element in the number of antenna elements capable of multi-allocation precoding.

Thereafter, in step 926, based on the capability information, the UE 904 may receive second configuration information from the network entity 902, configuring the UE 904 to transmit a second multi-allocation precoding transmission including a second plurality of differently precoded signals. As will be described in greater detail below, the second multi-allocation precoding transmission may be based on a second modulated signal obtain by the UE 904 transmitted by the UE 904 using a second plurality of antenna elements. Additionally, similar to the first multi-allocation precoding transmission transmitted by the network entity 902, the each differently precoded signal of the second plurality of differently precoded signals may correspond to a respective different portion of the second modulated signal and to a different antenna element of the second plurality of antenna elements of the UE.

Accordingly, in some cases, the second configuration information may indicate a number of antenna elements of the second plurality of antenna elements to use to for transmitting the second multi-allocation precoding transmission. Additionally, in some cases, the second configuration information may indicate an allocation of the respective different portions of the second modulated signal to the different antenna elements of the network entity. As an example, the configuration information may indicate that a first portion (e.g., first portion 824 illustrated in FIG. 8) of the second modulated signal (e.g., frequency-domain signal 810 illustrated in FIG. 8) should be allocated to a first antenna element (e.g., first antenna element 816 illustrated in FIG. 8) of the second plurality of antenna elements for transmission in a first differently precoded signal (e.g., first precoded signal 820 illustrated in FIG. 8) of the second plurality of differently precoded signals and that a second portion (e.g., second portion 826 illustrated in FIG. 8) of the second modulated signal should be allocated to a second antenna element (e.g., second antenna element 818 illustrated in FIG. 8) of the second plurality of antenna elements for transmission in a second differently precoded signal (e.g., second precoded signal 822 illustrated in FIG. 8) of the second plurality of differently precoded signals.

In some cases, the second configuration information (e.g., including the number of antenna elements and allocation of the respective different portions of the second modulated signal) may be based on EVM measurements performed by the network entity 902. For example, in some cases, the network entity 902 may transmit a request to the UE 904 to transmit a reference signal from each antenna element of the second plurality of antenna elements of the UE 904. The reference signal may include, for example, a sounding reference signal (SRS), a dummy physical uplink shared channel (PUSCH) transmission, and/or a new type of reference signal (e.g., EVM reference signal). In some cases, the request to transmit the reference signal may request that the UE 904 transmit the reference signal using a full transmission bandwidth or a partial transmission bandwidth associated with uplink transmissions by the UE 904.

In response to the request, the UE 904 may transmit the reference signal from each antenna element of the second plurality of antenna elements. The network entity 902 may then perform EVM measurements for each antenna element of the second plurality of antenna elements of the UE 904 based on the reference signal transmitted from that antenna element. The network entity 902 may then determine the number of antenna elements of the second plurality of antenna elements to use to for transmitting the second multi-allocation precoding transmission based the EVM measurements. Similarly, the network entity 902 may also determine the allocation of the respective different portions of the second modulated signal to the different antenna elements of the second plurality of antenna elements of the UE based on the EVM measurements.

Thereafter, in step 928, the UE 904 may obtain the second modulated signal for transmission. The second modulated signal may include data (e.g., data or control information) intended for the network entity 902.

In step 930, the UE 904 may then perform, based on the configuration information, multi-allocation precoding on the second modulated signal to obtain a second multi-allocation precoding transmission. In some cases, performing the multi-allocation precoding on the second modulated signal may include precoding different portions of the second modulated signal using different precoders to obtain the second plurality of differently precoded signals. In some cases, the techniques for performing the multi-allocation precoding on the second modulated signal may be similar to those described above with respect to the first modulated signal.

In step 932, the UE 904 transmits, to the network entity 902, the second multi-allocation precoding transmission, including the second plurality of differently precoded signals, using the second plurality of antenna elements. In some cases, transmitting the second multi-allocation precoding transmission comprises transmitting each differently precoded signal of the second plurality of differently precoded signals using the different antenna element, of the second plurality of antenna elements, corresponding to that differently precoded signal.

Thereafter, in step 932, after receiving the second multi-allocation precoding transmission including the second plurality of differently precoded signals, the network entity 902 may combine the second plurality of differently precoded signals to obtain the second modulated signal. Thereafter, in step 936, the network entity 902 may demodulate the second modulated signal to obtain the data intended for the network entity 902. In some cases, the network entity 902 may also perform channel estimation based on the second plurality of differently precoded signals using similar techniques as those described with respect to step 920 at the UE 904.

Example Operations of a User Equipment

Figure 10:
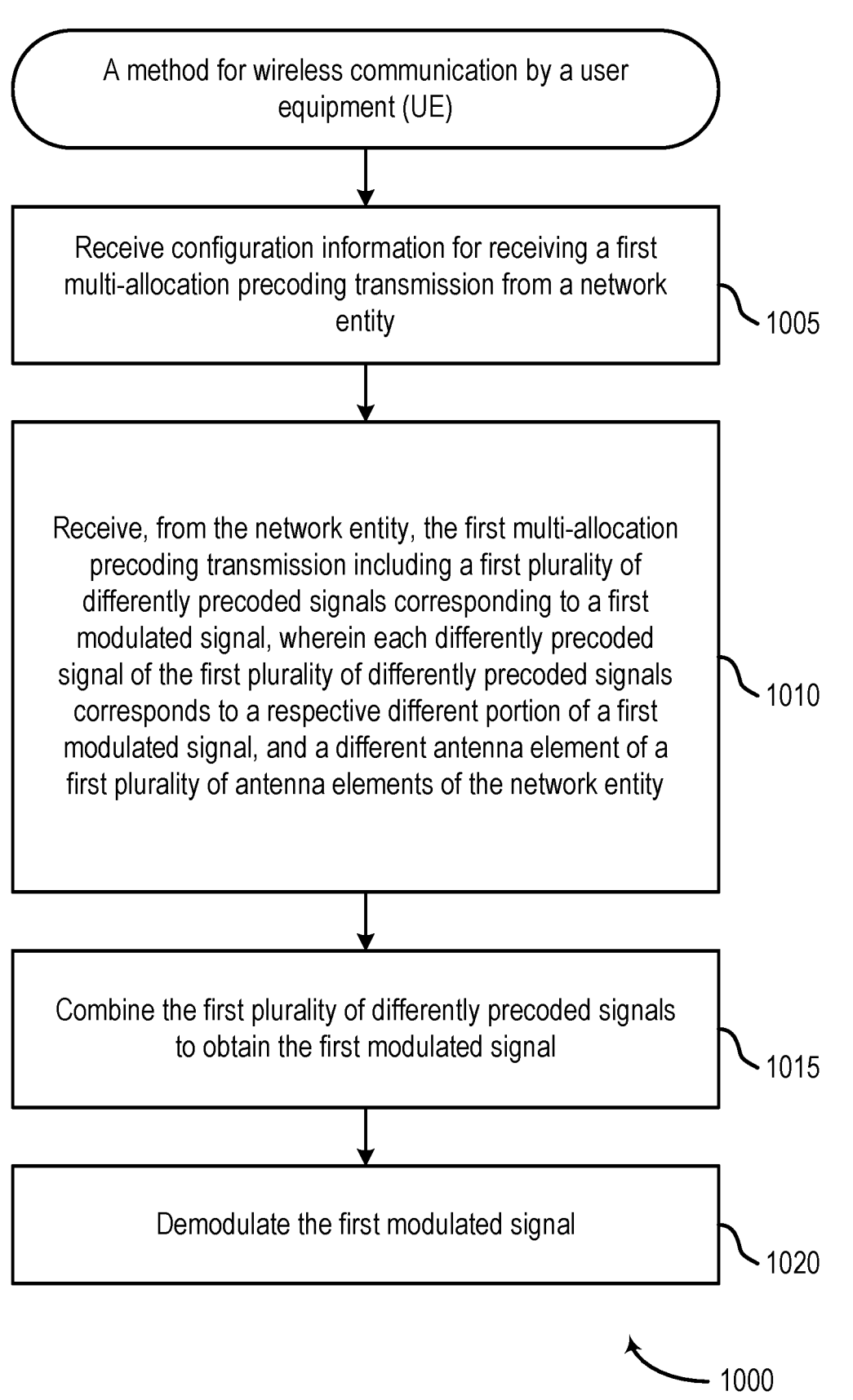
FIG. 10 depicts a method for wireless communications.

FIG. 10 shows an example of a method 1000 of wireless communication by a user equipment (UE), such as a UE 104 of FIGS. 1 and 3.

Method 1000 begins at step 1005 with receiving configuration information for receiving a first multi-allocation precoding transmission from a network entity. In some cases, the operations of this step refer to, or may be performed by, circuitry for receiving and/or code for receiving as described with reference to FIG. 12.

Method 1000 then proceeds to step 1010 with receiving, from the network entity, the first multi-allocation precoding transmission including a first plurality of differently precoded signals corresponding to a first modulated signal, wherein each differently precoded signal of the first plurality of differently precoded signals corresponds to a respective different portion of a first modulated signal, and a different antenna element of a first plurality of antenna elements of the network entity. In some cases, the operations of this step refer to, or may be performed by, circuitry for receiving and/or code for receiving as described with reference to FIG. 12.

Method 1000 then proceeds to step 1015 with combining the first plurality of differently precoded signals to obtain the first modulated signal. In some cases, the operations of this step refer to, or may be performed by, circuitry for combining and/or code for combining as described with reference to FIG. 12.

Method 1000 then proceeds to step 1020 with demodulating the first modulated signal. In some cases, the operations of this step refer to, or may be performed by, circuitry for demodulating and/or code for demodulating as described with reference to FIG. 12.

In some aspects, the configuration information comprises at least one of: a number of antenna elements of the first plurality of antenna elements used to transmit the first multi-allocation precoding transmission; information indicating an allocation of the different portions of the first modulated signal to the different antenna elements of the network entity; an indication of a number of layers used for transmitting the first multi-allocation precoding transmission per antenna element of the first plurality of antenna elements; or an indication of one or more demodulation reference signal (DMRS) associated with each antenna element of the first plurality of antenna elements.

In some aspects, the allocation of the different portions of the first modulated signal to the different antenna elements of the network entity is based on at least one of a link capacity between the network entity and UE and an error vector magnitude (EVM) associated with the network entity, or a machine learning algorithm.

In some aspects, the configuration information depends on at least one of channel conditions between the network entity and UE or a temperature associated with one or more components of the network entity, including the first plurality of antenna elements.

In some aspects, the first plurality of differently precoded signals comprises at least a first differently precoded signal and a second differently precoded signal; the first differently precoded signal is based on a first precoder applied to the first modulated signal, wherein the first differently precoded signal corresponds to a first portion of the first modulated signal and to a first antenna element of the first plurality of antenna elements of the network entity; and the second differently precoded signal is based on a second precoder applied to the first modulated signal, wherein the second differently precoded signal corresponds to a second portion of the first modulated signal and to a second antenna element of the first plurality of antenna elements of the network entity.

In some aspects, based on the first precoder, portions of the first modulated signal other than the first portion of the first modulated signal are removed from the first differently precoded signal, including at least the second portion of the first modulated signal; and based on the second precoder, portions of the first modulated signal other than the second portion of the first modulated signal are removed from the second differently precoded signal, including at least the first portion of the first modulated signal.

In some aspects, based on the first precoder, the other portions of the first modulated signal other than the first portion that are removed from the first differently precoded signal have transmission powers below a noise floor power associated with the first antenna element; and based on the second precoder, the other portions of the first modulated signal other than the second portion that are removed from the second differently precoded signal have transmission powers below a noise floor power associated with the second antenna element.

In some aspects, the method 1000 further includes receiving, from the network entity, configuration information to configure the UE to transmit a second multi-allocation precoding transmission including a second plurality of differently precoded signals. In some cases, the operations of this step refer to, or may be performed by, circuitry for receiving and/or code for receiving as described with reference to FIG. 12.

In some aspects, the method 1000 further includes obtaining a second modulated signal for transmission. In some cases, the operations of this step refer to, or may be performed by, circuitry for obtaining and/or code for obtaining as described with reference to FIG. 12.

In some aspects, the method 1000 further includes performing, based on the configuration information, multi-allocation precoding on the second modulated signal to obtain a second multi-allocation precoding transmission, comprising precoding different portions of the second modulated signal using different precoders to obtain a second plurality of differently precoded signals, wherein each differently precoded signal of the second plurality of differently precoded signals corresponds to a respective different portion of the second modulated signal, and a different antenna element of the second plurality of antenna elements of the UE. In some cases, the operations of this step refer to, or may be performed by, circuitry for performing and/or code for performing as described with reference to FIG. 12.

In some aspects, the method 1000 further includes transmitting, to the network entity, the second multi-allocation precoding transmission, including the second plurality of differently precoded signals, using the second plurality of antenna elements. In some cases, the operations of this step refer to, or may be performed by, circuitry for transmitting and/or code for transmitting as described with reference to FIG. 12.

In some aspects, transmitting the second multi-allocation precoding transmission comprises transmitting each differently precoded signal of the second plurality of differently precoded signals using the different antenna element, of the second plurality of antenna elements, corresponding to that differently precoded signal.

In some aspects, the configuration information comprises: a number of antenna elements of the second plurality of antenna elements to use to for transmitting the second multi-allocation precoding transmission; and an allocation of the respective different portions of the second modulated signal to the different antenna elements of the network entity.

In some aspects, the method 1000 further includes transmitting, to the network entity, capability information indicating a number of antenna elements capable of multi-allocation precoding and a respective error vector magnitude (EVM) for each antenna element in the number of antenna elements capable of multi-allocation precoding, wherein the number of antenna elements of the second plurality of antenna elements to use to for transmitting the second multi-allocation precoding transmission is based the capability information transmitted to the network entity, and the allocation of the respective different portions of the second modulated signal to the different antenna elements of the network entity is based on the capability information transmitted to the network entity. In some cases, the operations of this step refer to, or may be performed by, circuitry for transmitting and/or code for transmitting as described with reference to FIG. 12.

In some aspects, the method 1000 further includes receiving, from the network entity, a request to transmit a reference signal from each antenna element of the second plurality of antenna elements of the UE. In some cases, the operations of this step refer to, or may be performed by, circuitry for receiving and/or code for receiving as described with reference to FIG. 12.

In some aspects, the method 1000 further includes transmitting the reference signal from each antenna element of the second plurality of antenna elements, wherein the number of antenna elements of the second plurality of antenna elements to use to for transmitting the second multi-allocation precoding transmission is based on error vector magnitude (EVM) measurements associated with the reference signals transmitted from each antenna element of the second plurality of antenna elements, and the allocation of the respective different portions of the second modulated signal to the different antenna elements of the second plurality of antenna elements of the UE is based on the EVM measurements. In some cases, the operations of this step refer to, or may be performed by, circuitry for transmitting and/or code for transmitting as described with reference to FIG. 12.

In some aspects, the different portions of the first modulated signal correspond to different subchannels of the first modulated signal.

In some aspects, the method 1000 further includes performing separate channel estimation measurements for each differently precoded signal in the first plurality of differently precoded signals. In some cases, the operations of this step refer to, or may be performed by, circuitry for performing and/or code for performing as described with reference to FIG. 12.

Figure 12:
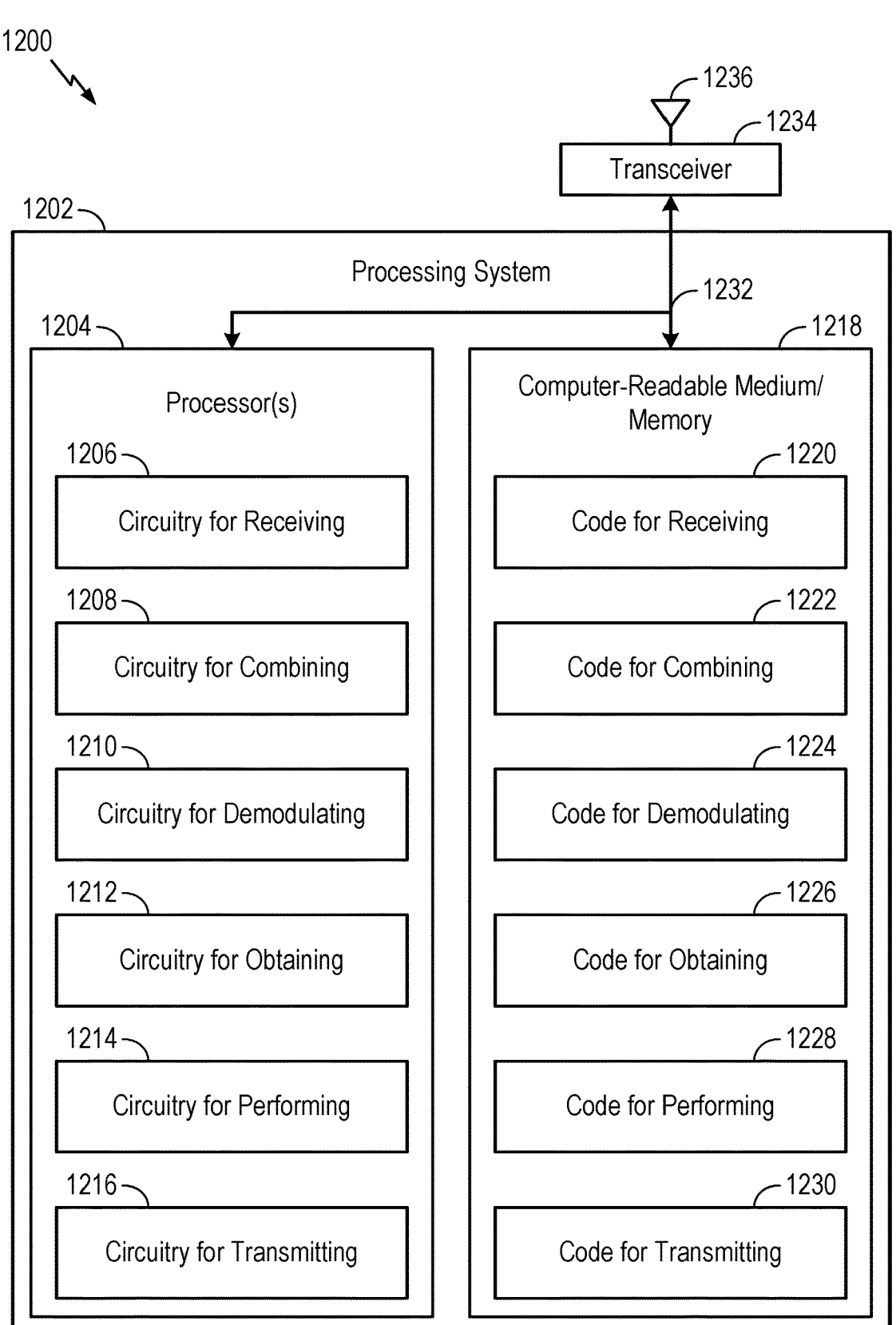
FIG. 12 depicts aspects of an example communications device.

In one aspect, method 1000, or any aspect related to it, may be performed by an apparatus, such as communications device 1200 of FIG. 12, which includes various components operable, configured, or adapted to perform the method 1000.

Communications device 1200 is described below in further detail.

Note that FIG. 10 is just one example of a method, and other methods including fewer, additional, or alternative steps are possible consistent with this disclosure.

Example Operations of a Network Entity

FIG. 11 shows an example of a method 1100 of wireless communication by a network entity, such as a BS 102 of FIGS. 1 and 3, or a disaggregated base station as discussed with respect to FIG. 2.

Method 1100 begins at step 1105 with obtaining a first modulated signal for transmission. In some cases, the operations of this step refer to, or may be performed by, circuitry for obtaining and/or code for obtaining as described with reference to FIG. 13.

Method 1100 then proceeds to step 1110 with performing multi-allocation precoding on the first modulated signal to obtain a first multi-allocation precoding transmission, comprising precoding different portions of the first modulated signal using different precoders to obtain a first plurality of differently precoded signals, wherein each differently precoded signal of the first plurality of differently precoded signals corresponds to a respective different portion of the different portions of the first modulated signal, and a different antenna element of a first plurality of antenna elements of the network entity. In some cases, the operations of this step refer to, or may be performed by, circuitry for performing and/or code for performing as described with reference to FIG. 13.

Method 1100 then proceeds to step 1115 with transmitting, to a user equipment (UE), the first multi-allocation precoding transmission, including the plurality of differently precoded signals, using the first plurality of antenna elements. In some cases, the operations of this step refer to, or may be performed by, circuitry for transmitting and/or code for transmitting as described with reference to FIG. 13.

In some aspects, transmitting the first multi-allocation precoding transmission comprises transmitting each differently precoded signal of the first plurality of differently precoded signals using the different antenna element, of the first plurality of antenna elements, corresponding to that differently precoded signal.

In some aspects, the configuration information depends on at least one of channel conditions between the network entity and UE or a temperature associated with one or more components of the network entity, including the first plurality of antenna elements.

In some aspects, the method 1100 further includes transmitting configuration information for the first multi-allocation precoding transmission to the UE, wherein the configuration information comprises at least one of: a number of antenna elements of the first plurality of antenna elements used to transmit the first multi-allocation precoding transmission, information indicating the allocation of the different portions of the first modulated signal to the different antenna elements of the network entity, an indication of a number of layers used for transmitting the first multi-allocation precoding transmission per antenna element of the first plurality of antenna elements, or an indication of one or more demodulation reference signal (DMRS) associated with each antenna element of the first plurality of antenna elements. In some cases, the operations of this step refer to, or may be performed by, circuitry for transmitting and/or code for transmitting as described with reference to FIG. 13.

In some aspects, precoding the different portions of the first modulated signal using different precoders, comprises at least: applying a first precoder to the first modulated signal to obtain a first differently precoded signal of the first plurality of differently precoded signals corresponding to a first portion of the first modulated signal and to a first antenna element of the first plurality of antenna elements; and applying a second precoder to the first modulated signal to obtain a second differently precoded signal of the first plurality of differently precoded signals corresponding to a second portion of the first modulated signal and to a second antenna element of the first plurality of antenna elements.

In some aspects, applying the first precoder to the first modulated signal removes portions of the first modulated signal, from the first differently precoded signal, other than the first portion of the first modulated signal, including at least the second portion of the first modulated signal; and applying the second precoder to the first modulated signal removes portions of the first modulated signal, from the second differently precoded signal, other than the second portion of the first modulated signal, including at least the first portion of the first modulated signal.

In some aspects, to remove the other portions of the first modulated signal other than the first portion from the first differently precoded signal, the first precoder reduces a transmission power associated with these other portions to zero; and to remove the other portions of the first modulated signal other than the second portion from the second differently precoded signal, the second precoder reduces a transmission power associated with these other portions to zero.

In some aspects, different portions of the first modulated signal are allocated to respective different antenna elements of a first plurality of antenna elements of the network entity for transmission.

In some aspects, the method 1100 further includes determining the allocation of the different portions of the first modulated signal to the different antenna elements of the network entity based on at least one of a link capacity between the network entity and UE and an error vector magnitude (EVM) associated with the network entity, or a machine learning algorithm. In some cases, the operations of this step refer to, or may be performed by, circuitry for determining and/or code for determining as described with reference to FIG. 13.

In some aspects, the method 1100 further includes transmitting, to the UE, configuration information to configure the UE to transmit a second multi-allocation precoding transmission including a second plurality of differently precoded signals. In some cases, the operations of this step refer to, or may be performed by, circuitry for transmitting and/or code for transmitting as described with reference to FIG. 13.

In some aspects, the method 1100 further includes receiving, based on the configuration information, the second multi-allocation precoding transmission including the second plurality of differently precoded signals, wherein each differently precoded signal of the second plurality of differently precoded signals corresponds to a respective different portion of a second modulated signal and to a different antenna element of a second plurality of antenna elements of the UE. In some cases, the operations of this step refer to, or may be performed by, circuitry for receiving and/or code for receiving as described with reference to FIG. 13.

In some aspects, the method 1100 further includes combining the second plurality of differently precoded signals to obtain the second modulated signal. In some cases, the operations of this step refer to, or may be performed by, circuitry for combining and/or code for combining as described with reference to FIG. 13.

In some aspects, the method 1100 further includes demodulating the second modulated signal. In some cases, the operations of this step refer to, or may be performed by, circuitry for demodulating and/or code for demodulating as described with reference to FIG. 13.

In some aspects, the configuration information comprises: a number of antenna elements of the second plurality of antenna elements to use to for transmitting the second multi-allocation precoding transmission; and an allocation of the respective different portions of the second modulated signal to the different antenna elements of the network entity.

In some aspects, the method 1100 further includes receiving, from the UE, capability information indicating a number of antenna elements capable of multi-allocation precoding and a respective error vector magnitude (EVM) for each antenna element in the number of antenna elements capable of multi-allocation precoding, wherein the number of antenna elements of the second plurality of antenna elements to use to for transmitting the second multi-allocation precoding transmission is based the capability information received from the UE, and the allocation of the respective different portions of the second modulated signal to the different antenna elements of the network entity is based on the capability information received from the UE. In some cases, the operations of this step refer to, or may be performed by, circuitry for receiving and/or code for receiving as described with reference to FIG. 13.

In some aspects, the method 1100 further includes transmitting, to the UE, a request to transmit a reference signal from each antenna element of the second plurality of antenna elements of the UE. In some cases, the operations of this step refer to, or may be performed by, circuitry for transmitting and/or code for transmitting as described with reference to FIG. 13.

In some aspects, the method 1100 further includes performing error vector magnitude (EVM) measurements for each antenna element of the second plurality of antenna elements of the UE based on the reference signal transmitted from that antenna element, wherein the number of antenna elements of the second plurality of antenna elements to use to for transmitting the second multi-allocation precoding transmission is based the EVM measurements, and the allocation of the respective different portions of the second modulated signal to the different antenna elements of the second plurality of antenna elements of the UE is based on the EVM measurements. In some cases, the operations of this step refer to, or may be performed by, circuitry for performing and/or code for performing as described with reference to FIG. 13.

In some aspects, the different portions of the first modulated signal correspond to different subchannels of the first modulated signal.

Figure 13:
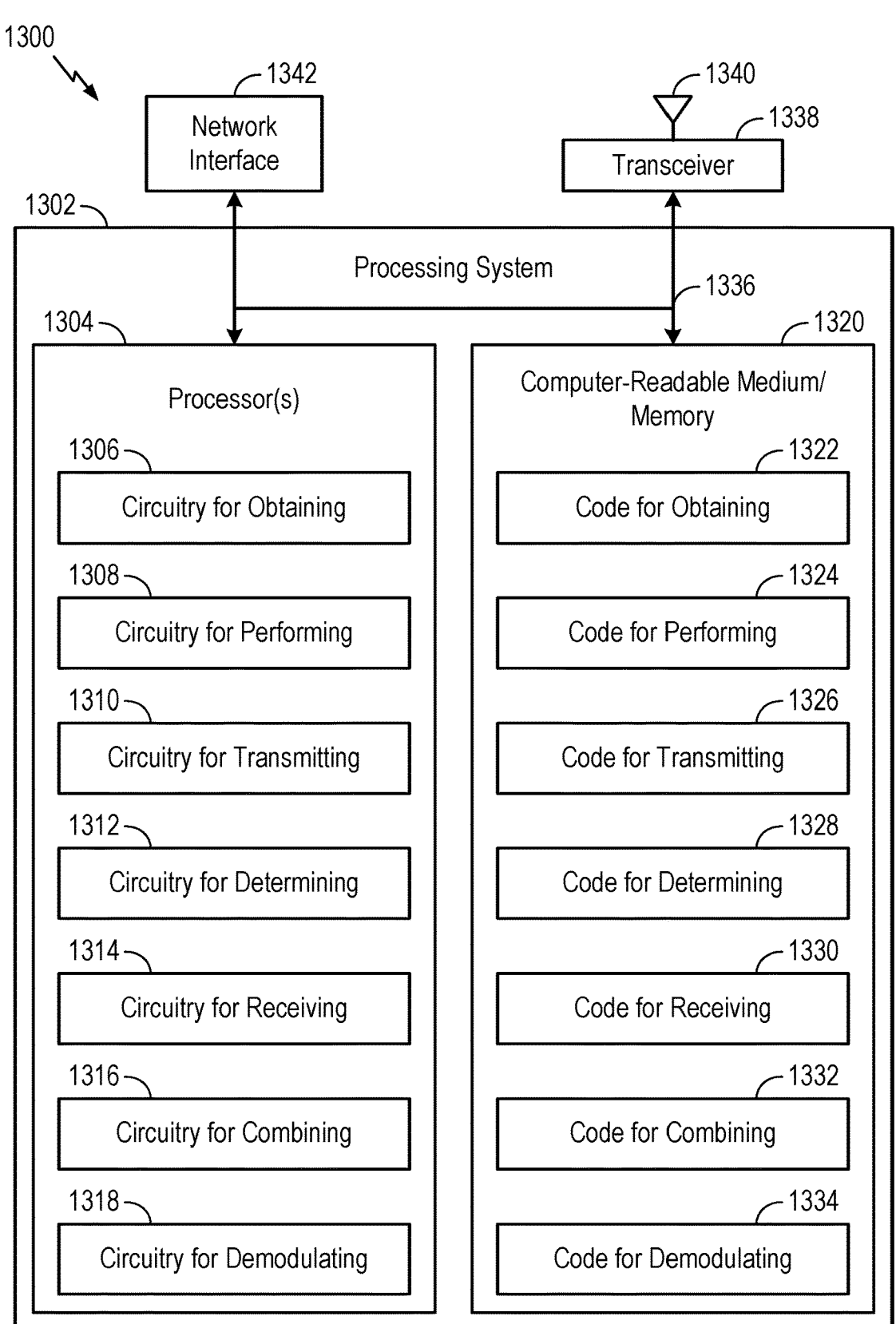
FIG. 13 depicts aspects of an example communications device.

In one aspect, method 1100, or any aspect related to it, may be performed by an apparatus, such as communications device 1300 of FIG. 13, which includes various components operable, configured, or adapted to perform the method 1100. Communications device 1300 is described below in further detail.

Note that FIG. 11 is just one example of a method, and other methods including fewer, additional, or alternative steps are possible consistent with this disclosure.

FIG. 11 shows an example of a method 1100 of wireless communication by a network entity, such as a BS 102 of FIGS. 1 and 3, or a disaggregated base station as discussed with respect to FIG. 2.

Method 1100 begins at step 1105 with obtaining a first modulated signal for transmission. In some cases, the operations of this step refer to, or may be performed by, circuitry for obtaining and/or code for obtaining as described with reference to FIG. 13.

Method 1100 then proceeds to step 1110 with performing multi-allocation precoding on the first modulated signal to obtain a first multi-allocation precoding transmission, comprising precoding different portions of the first modulated signal using different precoders to obtain a first plurality of differently precoded signals, wherein each differently precoded signal of the first plurality of differently precoded signals corresponds to a respective different portion of the different portions of the first modulated signal, and a different antenna element of a first plurality of antenna elements of the network entity. In some cases, the operations of this step refer to, or may be performed by, circuitry for performing and/or code for performing as described with reference to FIG. 13.

Method 1100 then proceeds to step 1115 with transmitting, to a user equipment (UE), the first multi-allocation precoding transmission, including the plurality of differently precoded signals, using the first plurality of antenna elements. In some cases, the operations of this step refer to, or may be performed by, circuitry for transmitting and/or code for transmitting as described with reference to FIG. 13.

In some aspects, transmitting the first multi-allocation precoding transmission comprises transmitting each differently precoded signal of the first plurality of differently precoded signals using the different antenna element, of the first plurality of antenna elements, corresponding to that differently precoded signal.

In some aspects, the configuration information depends on at least one of channel conditions between the network entity and UE or a temperature associated with one or more components of the network entity, including the first plurality of antenna elements.

In some aspects, the method 1100 further includes transmitting configuration information for the first multi-allocation precoding transmission to the UE, wherein the configuration information comprises at least one of: a number of antenna elements of the first plurality of antenna elements used to transmit the first multi-allocation precoding transmission, information indicating the allocation of the different portions of the first modulated signal to the different antenna elements of the network entity, an indication of a number of layers used for transmitting the first multi-allocation precoding transmission per antenna element of the first plurality of antenna elements, or an indication of one or more demodulation reference signal (DMRS) associated with each antenna element of the first plurality of antenna elements. In some cases, the operations of this step refer to, or may be performed by, circuitry for transmitting and/or code for transmitting as described with reference to FIG. 13.

In some aspects, precoding the different portions of the first modulated signal using different precoders, comprises at least: applying a first precoder to the first modulated signal to obtain a first differently precoded signal of the first plurality of differently precoded signals corresponding to a first portion of the first modulated signal and to a first antenna element of the first plurality of antenna elements; and applying a second precoder to the first modulated signal to obtain a second differently precoded signal of the first plurality of differently precoded signals corresponding to a second portion of the first modulated signal and to a second antenna element of the first plurality of antenna elements.

In some aspects, applying the first precoder to the first modulated signal removes portions of the first modulated signal, from the first differently precoded signal, other than the first portion of the first modulated signal, including at least the second portion of the first modulated signal; and applying the second precoder to the first modulated signal removes portions of the first modulated signal, from the second differently precoded signal, other than the second portion of the first modulated signal, including at least the first portion of the first modulated signal.

In some aspects, to remove the other portions of the first modulated signal other than the first portion from the first differently precoded signal, the first precoder reduces a transmission power associated with these other portions to zero; and to remove the other portions of the first modulated signal other than the second portion from the second differently precoded signal, the second precoder reduces a transmission power associated with these other portions to zero.

In some aspects, different portions of the first modulated signal are allocated to respective different antenna elements of a first plurality of antenna elements of the network entity for transmission.

In some aspects, the method 1100 further includes determining the allocation of the different portions of the first modulated signal to the different antenna elements of the network entity based on at least one of a link capacity between the network entity and UE and an error vector magnitude (EVM) associated with the network entity, or a machine learning algorithm. In some cases, the operations of this step refer to, or may be performed by, circuitry for determining and/or code for determining as described with reference to FIG. 13.

In some aspects, the method 1100 further includes transmitting, to the UE, configuration information to configure the UE to transmit a second multi-allocation precoding transmission including a second plurality of differently precoded signals. In some cases, the operations of this step refer to, or may be performed by, circuitry for transmitting and/or code for transmitting as described with reference to FIG. 13.

In some aspects, the method 1100 further includes receiving, based on the configuration information, the second multi-allocation precoding transmission including the second plurality of differently precoded signals, wherein each differently precoded signal of the second plurality of differently precoded signals corresponds to a respective different portion of a second modulated signal and to a different antenna element of a second plurality of antenna elements of the UE. In some cases, the operations of this step refer to, or may be performed by, circuitry for receiving and/or code for receiving as described with reference to FIG. 13.

In some aspects, the method 1100 further includes combining the second plurality of differently precoded signals to obtain the second modulated signal. In some cases, the operations of this step refer to, or may be performed by, circuitry for combining and/or code for combining as described with reference to FIG. 13.

In some aspects, the method 1100 further includes demodulating the second modulated signal. In some cases, the operations of this step refer to, or may be performed by, circuitry for demodulating and/or code for demodulating as described with reference to FIG. 13.

In some aspects, the configuration information comprises: a number of antenna elements of the second plurality of antenna elements to use to for transmitting the second multi-allocation precoding transmission; and an allocation of the respective different portions of the second modulated signal to the different antenna elements of the network entity.

In some aspects, the method 1100 further includes receiving, from the UE, capability information indicating a number of antenna elements capable of multi-allocation precoding and a respective error vector magnitude (EVM) for each antenna element in the number of antenna elements capable of multi-allocation precoding, wherein the number of antenna elements of the second plurality of antenna elements to use to for transmitting the second multi-allocation precoding transmission is based the capability information received from the UE, and the allocation of the respective different portions of the second modulated signal to the different antenna elements of the network entity is based on the capability information received from the UE. In some cases, the operations of this step refer to, or may be performed by, circuitry for receiving and/or code for receiving as described with reference to FIG. 13.

In some aspects, the method 1100 further includes transmitting, to the UE, a request to transmit a reference signal from each antenna element of the second plurality of antenna elements of the UE. In some cases, the operations of this step refer to, or may be performed by, circuitry for transmitting and/or code for transmitting as described with reference to FIG. 13.

In some aspects, the method 1100 further includes performing error vector magnitude (EVM) measurements for each antenna element of the second plurality of antenna elements of the UE based on the reference signal transmitted from that antenna element, wherein the number of antenna elements of the second plurality of antenna elements to use to for transmitting the second multi-allocation precoding transmission is based the EVM measurements, and the allocation of the respective different portions of the second modulated signal to the different antenna elements of the second plurality of antenna elements of the UE is based on the EVM measurements. In some cases, the operations of this step refer to, or may be performed by, circuitry for performing and/or code for performing as described with reference to FIG. 13.

In some aspects, the different portions of the first modulated signal correspond to different subchannels of the first modulated signal.

In one aspect, method 1100, or any aspect related to it, may be performed by an apparatus, such as communications device 1300 of FIG. 13, which includes various components operable, configured, or adapted to perform the method 1100. Communications device 1300 is described below in further detail.

Note that FIG. 11 is just one example of a method, and other methods including fewer, additional, or alternative steps are possible consistent with this disclosure.

Example Communications Devices

FIG. 12 depicts aspects of an example communications device 1200. In some aspects, communications device 1200 is a user equipment, such as UE 104 described above with respect to FIGS. 1 and 3.

The communications device 1200 includes a processing system 1205 coupled to the transceiver 1285 (e.g., a transmitter and/or a receiver). The transceiver 1285 is configured to transmit and receive signals for the communications device 1200 via the antenna 1290, such as the various signals as described herein. The processing system 1205 may be configured to perform processing functions for the communications device 1200, including processing signals received and/or to be transmitted by the communications device 1200.

The processing system 1205 includes one or more processors 1210. In various aspects, the one or more processors 1210 may be representative of one or more of receive processor 358, transmit processor 364, TX MIMO processor 366, and/or controller/processor 380, as described with respect to FIG. 3. The one or more processors 1210 are coupled to a computer-readable medium/memory 1245 via a bus 1280. In certain aspects, the computer-readable medium/memory 1245 is configured to store instructions (e.g., computer-executable code) that when executed by the one or more processors 1210, cause the one or more processors 1210 to perform the method 1000 described with respect to FIG. 10, or any aspect related to it. Note that reference to a processor performing a function of communications device 1200 may include one or more processors 1210 performing that function of communications device 1200.

In the depicted example, computer-readable medium/memory 1245 stores code (e.g., executable instructions), such as code for receiving 1250, code for combining 1255, code for demodulating 1260, code for obtaining 1265, code for performing 1270, and code for transmitting 1275. Processing of the code for receiving 1250, code for combining 1255, code for demodulating 1260, code for obtaining 1265, code for performing 1270, and code for transmitting 1275 may cause the communications device 1200 to perform the method 1000 described with respect to FIG. 10, or any aspect related to it.

The one or more processors 1210 include circuitry configured to implement (e.g., execute) the code stored in the computer-readable medium/memory 1245, including circuitry such as circuitry for receiving 1215, circuitry for combining 1220, circuitry for demodulating 1225, circuitry for obtaining 1230, circuitry for performing 1235, and circuitry for transmitting 1240. Processing with circuitry for receiving 1215, circuitry for combining 1220, circuitry for demodulating 1225, circuitry for obtaining 1230, circuitry for performing 1235, and circuitry for transmitting 1240 may cause the communications device 1200 to perform the method 1000 described with respect to FIG. 10, or any aspect related to it.

Various components of the communications device 1200 may provide means for performing the method 1000 described with respect to FIG. 10, or any aspect related to it. For example, means for transmitting, sending or outputting for transmission may include transceivers 354 and/or antenna(s) 352 of the UE 104 illustrated in FIG. 3 and/or the transceiver 1285 and the antenna 1290 of the communications device 1200 in FIG. 12. Means for receiving or obtaining may include transceivers 354 and/or antenna(s) 352 of the UE 104 illustrated in FIG. 3 and/or the transceiver 1285 and the antenna 1290 of the communications device 1200 in FIG. 12.

FIG. 13 depicts aspects of an example communications device 1300. In some aspects, communications device 1300 is a network entity, such as BS 102 of FIGS. 1 and 3, or a disaggregated base station as discussed with respect to FIG. 2.

The communications device 1300 includes a processing system 1302 coupled to the transceiver 1338 (e.g., a transmitter and/or a receiver) and/or a network interface 1342. The transceiver 1338 is configured to transmit and receive signals for the communications device 1300 via the antenna 1340, such as the various signals as described herein. The network interface 1342 is configured to obtain and send signals for the communications device 1300 via communication link(s), such as a backhaul link, midhaul link, and/or fronthaul link as described herein, such as with respect to FIG. 2. The processing system 1302 may be configured to perform processing functions for the communications device 1300, including processing signals received and/or to be transmitted by the communications device 1300.

The processing system 1302 includes one or more processors 1304. In various aspects, one or more processors 1304 may be representative of one or more of receive processor 338, transmit processor 320, TX MIMO processor 330, and/or controller/processor 340, as described with respect to FIG. 3. The one or more processors 1304 are coupled to a computer-readable medium/memory 1320 via a bus 1336. In certain aspects, the computer-readable medium/ memory 1320 is configured to store instructions (e.g., computer-executable code) that when executed by the one or more processors 1304, cause the one or more processors 1304 to perform the method 1100 described with respect to FIG. 11, or any aspect related to it. Note that reference to a processor of communications device 1300 performing a function may include one or more processors 1304 of communications device 1300 performing that function.

In the depicted example, the computer-readable medium/ memory 1320 stores code (e.g., executable instructions), such as code for obtaining 1322, code for performing 1324, code for transmitting 1326, code for determining 1328, code for receiving 1330, code for combining 1332, and code for demodulating 1334. Processing of the code for obtaining 1322, code for performing 1324, code for transmitting 1326, code for determining 1328, code for receiving 1330, code for combining 1332, and code for demodulating 1334 may cause the communications device 1300 to perform the method 1100 described with respect to FIG. 11, or any aspect related to it.

The one or more processors 1304 include circuitry configured to implement (e.g., execute) the code stored in the computer-readable medium/memory 1320, including circuitry such as circuitry for obtaining 1306, circuitry for performing 1308, circuitry for transmitting 1310, circuitry for determining 1312, circuitry for receiving 1314, circuitry for combining 1316, and circuitry for demodulating 1318. Processing with circuitry for obtaining 1306, circuitry for performing 1308, circuitry for transmitting 1310, circuitry for determining 1312, circuitry for receiving 1314, circuitry for combining 1316, and circuitry for demodulating 1318 may cause the communications device 1300 to perform the method 1100 described with respect to FIG. 11, or any aspect related to it.

Various components of the communications device 1300 may provide means for performing the method 1100 described with respect to FIG. 11, or any aspect related to it. Means for transmitting, sending or outputting for transmission may include transceivers 332 and/or antenna(s) 334 of the BS 102 illustrated in FIG. 3 and/or the transceiver 1338 and the antenna 1340 of the communications device 1300 in FIG. 13. Means for receiving or obtaining may include transceivers 332 and/or antenna(s) 334 of the BS 102 illustrated in FIG. 3 and/or the transceiver 1338 and the antenna 1340 of the communications device 1300 in FIG. 13.

Example Clauses

Implementation examples are described in the following numbered clauses:

Clause 1: A method for wireless communication by a network entity, comprising: obtaining a first modulated signal for transmission; performing multi-allocation precoding on the first modulated signal to obtain a first multi-allocation precoding transmission, comprising precoding different portions of the first modulated signal using different precoders to obtain a first plurality of differently precoded signals, wherein each differently precoded signal of the first plurality of differently precoded signals corresponds to a respective different portion of the different portions of the first modulated signal, and a different antenna element of a first plurality of antenna elements of the network entity; and transmitting, to a user equipment (UE), the first multi-allocation precoding transmission, including the plurality of differently precoded signals, using the first plurality of antenna elements.

Clause 2: The method of Clause 1, wherein transmitting the first multi-allocation precoding transmission comprises transmitting each differently precoded signal of the first plurality of differently precoded signals using the different antenna element, of the first plurality of antenna elements, corresponding to that differently precoded signal.

Clause 3: The method of any one of Clauses 1-2, further comprising transmitting configuration information for the first multi-allocation precoding transmission to the UE, wherein the configuration information comprises at least one of: a number of antenna elements of the first plurality of antenna elements used to transmit the first multi-allocation precoding transmission, information indicating the allocation of the different portions of the first modulated signal to the different antenna elements of the network entity, an indication of a number of layers used for transmitting the first multi-allocation precoding transmission per antenna element of the first plurality of antenna elements, or an indication of one or more demodulation reference signal (DMRS) associated with each antenna element of the first plurality of antenna elements.

Clause 4: The method of Clause 3, wherein the configuration information depends on at least one of channel conditions between the network entity and UE or a temperature associated with one or more components of the network entity, including the first plurality of antenna elements.

Clause 5: The method of any one of Clauses 1-4, wherein precoding the different portions of the first modulated signal using different precoders, comprises at least: applying a first precoder to the first modulated signal to obtain a first differently precoded signal of the first plurality of differently precoded signals corresponding to a first portion of the first modulated signal and to a first antenna element of the first plurality of antenna elements; and applying a second precoder to the first modulated signal to obtain a second differently precoded signal of the first plurality of differently precoded signals corresponding to a second portion of the first modulated signal and to a second antenna element of the first plurality of antenna elements.

Clause 6: The method of Clause 5, wherein: applying the first precoder to the first modulated signal removes portions of the first modulated signal, from the first differently precoded signal, other than the first portion of the first modulated signal, including at least the second portion of the first modulated signal; and applying the second precoder to the first modulated signal removes portions of the first modulated signal, from the second differently precoded signal, other than the second portion of the first modulated signal, including at least the first portion of the first modulated signal.

Clause 7: The method of Clause 6, wherein: to remove the other portions of the first modulated signal other than the first portion from the first differently precoded signal, the first precoder reduces a transmission power associated with these other portions to zero; and to remove the other portions of the first modulated signal other than the second portion from the second differently precoded signal, the second precoder reduces a transmission power associated with these other portions to zero.

Clause 8: The method of any one of Clauses 1-7, wherein different portions of the first modulated signal are allocated to respective different antenna elements of a first plurality of antenna elements of the network entity for transmission.

Clause 9: The method of Clause 8, further comprising determining the allocation of the different portions of the first modulated signal to the different antenna elements of the network entity based on at least one of a link capacity between the network entity and UE and an error vector magnitude (EVM) associated with the network entity, or a machine learning algorithm.

Clause 10: The method of any one of Clauses 1-9, further comprising: transmitting, to the UE, configuration information to configure the ULE to transmit a second multi-allocation precoding transmission including a second plurality of differently precoded signals; receiving, based on the configuration information, the second multi-allocation precoding transmission including the second plurality of differently precoded signals, wherein each differently precoded signal of the second plurality of differently precoded signals corresponds to a respective different portion of a second modulated signal and to a different antenna element of a second plurality of antenna elements of the UE; combining the second plurality of differently precoded signals to obtain the second modulated signal; and demodulating the second modulated signal.

Clause 11: The method of Clause 10, wherein the configuration information comprises: a number of antenna elements of the second plurality of antenna elements to use to for transmitting the second multi-allocation precoding transmission; and an allocation of the respective different portions of the second modulated signal to the different antenna elements of the network entity.

Clause 12: The method of Clause 11, further comprising receiving, from the UE, capability information indicating a number of antenna elements capable of multi-allocation precoding and a respective error vector magnitude (EVM) for each antenna element in the number of antenna elements capable of multi-allocation precoding, wherein the number of antenna elements of the second plurality of antenna elements to use to for transmitting the second multi-allocation precoding transmission is based the capability information received from the UE, and the allocation of the respective different portions of the second modulated signal to the different antenna elements of the network entity is based on the capability information received from the UE.

Clause 13: The method of Clause 11, further comprising: transmitting, to the UE, a request to transmit a reference signal from each antenna element of the second plurality of antenna elements of the UE; and performing error vector magnitude (EVM) measurements for each antenna element of the second plurality of antenna elements of the UE based on the reference signal transmitted from that antenna element, wherein the number of antenna elements of the second plurality of antenna elements to use to for transmitting the second multi-allocation precoding transmission is based the EVM measurements, and the allocation of the respective different portions of the second modulated signal to the different antenna elements of the second plurality of antenna elements of the UE is based on the EVM measurements.

Clause 14: The method of any one of Clauses 1-13, wherein the different portions of the first modulated signal correspond to different subchannels of the first modulated signal.

Clause 15: A method for wireless communication by a user equipment (UE), comprising: receiving configuration information for receiving a first multi-allocation precoding transmission from a network entity; receiving, from the network entity, the first multi-allocation precoding transmission including a first plurality of differently precoded signals corresponding to a first modulated signal, wherein each differently precoded signal of the first plurality of differently precoded signals corresponds to a respective different portion of a first modulated signal, and a different antenna element of a first plurality of antenna elements of the network entity; combining the first plurality of differently precoded signals to obtain the first modulated signal; and demodulating the first modulated signal.

Clause 16: The method of Clause 15, wherein the configuration information comprises at least one of: a number of antenna elements of the first plurality of antenna elements used to transmit the first multi-allocation precoding transmission; information indicating an allocation of the different portions of the first modulated signal to the different antenna elements of the network entity; an indication of a number of layers used for transmitting the first multi-allocation precoding transmission per antenna element of the first plurality of antenna elements; or an indication of one or more demodulation reference signal (DMRS) associated with each antenna element of the first plurality of antenna elements.

Clause 17: The method of Clause 16, wherein the allocation of the different portions of the first modulated signal to the different antenna elements of the network entity is based on at least one of a link capacity between the network entity and UE and an error vector magnitude (EVM) associated with the network entity, or a machine learning algorithm.

Clause 18: The method of Clause 16, wherein the configuration information depends on at least one of channel conditions between the network entity and UE or a temperature associated with one or more components of the network entity, including the first plurality of antenna elements.

Clause 19: The method of any one of Clauses 15-18, wherein: the first plurality of differently precoded signals comprises at least a first differently precoded signal and a second differently precoded signal; the first differently precoded signal is based on a first precoder applied to the first modulated signal, wherein the first differently precoded signal corresponds to a first portion of the first modulated signal and to a first antenna element of the first plurality of antenna elements of the network entity; and the second differently precoded signal is based on a second precoder applied to the first modulated signal, wherein the second differently precoded signal corresponds to a second portion of the first modulated signal and to a second antenna element of the first plurality of antenna elements of the network entity.

Clause 20: The method of Clause 19, wherein: based on the first precoder, portions of the first modulated signal other than the first portion of the first modulated signal are removed from the first differently precoded signal, including at least the second portion of the first modulated signal; and based on the second precoder, portions of the first modulated signal other than the second portion of the first modulated signal are removed from the second differently precoded signal, including at least the first portion of the first modulated signal.

Clause 21: The method of Clause 20, wherein: based on the first precoder, the other portions of the first modulated signal other than the first portion that are removed from the first differently precoded signal have transmission powers below a noise floor power associated with the first antenna element; and based on the second precoder, the other portions of the first modulated signal other than the second portion that are removed from the second differently precoded signal have transmission powers below a noise floor power associated with the second antenna element.

Clause 22: The method of any one of Clauses 15-21, further comprising: receiving, from the network entity, configuration information to configure the UE to transmit a second multi-allocation precoding transmission including a second plurality of differently precoded signals; obtaining a second modulated signal for transmission; performing, based on the configuration information, multi-allocation precoding on the second modulated signal to obtain a second multi-allocation precoding transmission, comprising precoding different portions of the second modulated signal using different precoders to obtain a second plurality of differently precoded signals, wherein each differently precoded signal of the second plurality of differently precoded signals corresponds to a respective different portion of the second modulated signal, and a different antenna element of the second plurality of antenna elements of the UE; and transmitting, to the network entity, the second multi-allocation precoding transmission, including the second plurality of differently precoded signals, using the second plurality of antenna elements.

Clause 23: The method of Clause 22, wherein transmitting the second multi-allocation precoding transmission comprises transmitting each differently precoded signal of the second plurality of differently precoded signals using the different antenna element, of the second plurality of antenna elements, corresponding to that differently precoded signal.

Clause 24: The method of Clause 22, wherein the configuration information comprises: a number of antenna elements of the second plurality of antenna elements to use to for transmitting the second multi-allocation precoding transmission; and an allocation of the respective different portions of the second modulated signal to the different antenna elements of the network entity.

Clause 25: The method of Clause 24, further comprising transmitting, to the network entity, capability information indicating a number of antenna elements capable of multi-allocation precoding and a respective error vector magnitude (EVM) for each antenna element in the number of antenna elements capable of multi-allocation precoding, wherein the number of antenna elements of the second plurality of antenna elements to use to for transmitting the second multi-allocation precoding transmission is based the capability information transmitted to the network entity, and the allocation of the respective different portions of the second modulated signal to the different antenna elements of the network entity is based on the capability information transmitted to the network entity.

Clause 26: The method of Clause 24, further comprising: receiving, from the network entity, a request to transmit a reference signal from each antenna element of the second plurality of antenna elements of the UE; and transmitting the reference signal from each antenna element of the second plurality of antenna elements, wherein the number of antenna elements of the second plurality of antenna elements to use to for transmitting the second multi-allocation precoding transmission is based on error vector magnitude (EVM) measurements associated with the reference signals transmitted from each antenna element of the second plurality of antenna elements, and the allocation of the respective different portions of the second modulated signal to the different antenna elements of the second plurality of antenna elements of the UE is based on the EVM measurements.

Clause 27: The method of any one of Clauses 15-26, wherein the different portions of the first modulated signal correspond to different subchannels of the first modulated signal.

Clause 28: The method of any one of Clauses 15-27, further comprising performing separate channel estimation measurements for each differently precoded signal in the first plurality of differently precoded signals.

Clause 29: An apparatus, comprising: a memory comprising executable instructions; and a processor configured to execute the executable instructions and cause the apparatus to perform a method in accordance with any one of Clauses 1-28.

Clause 30: An apparatus, comprising means for performing a method in accordance with any one of Clauses 1-28.

Clause 31: A non-transitory computer-readable medium comprising executable instructions that, when executed by a processor of an apparatus, cause the apparatus to perform a method in accordance with any one of Clauses 1-28.

Clause 32: A computer program product embodied on a computer-readable storage medium comprising code for performing a method in accordance with any one of Clauses 1-28.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a network entity, comprising:
    obtaining a first modulated signal for transmission;
    performing multi-allocation precoding on the first modulated signal to obtain a first multi-allocation precoding transmission, comprising precoding different portions of the first modulated signal using different precoders to obtain a first plurality of differently precoded signals, wherein each differently precoded signal of the first plurality of differently precoded signals corresponds to:
        a respective different portion of the different portions of the first modulated signal; and
        a different antenna element of a first plurality of antenna elements of the network entity; and transmitting, to a user equipment (UE), the first multi-allocation precoding transmission, including the plurality of differently precoded signals, using the first plurality of antenna elements.

2. The method of claim 1, wherein transmitting the first multi-allocation precoding transmission comprises transmitting each differently precoded signal of the first plurality of differently precoded signals using the different antenna element, of the first plurality of antenna elements, corresponding to that differently precoded signal.

3. The method of claim 1, further comprising transmitting configuration information for the first multi-allocation precoding transmission to the UE, wherein the configuration information comprises at least one of:
    a number of antenna elements of the first plurality of antenna elements used to transmit the first multi-allocation precoding transmission;
    information indicating the allocation of the different portions of the first modulated signal to the different antenna elements of the network entity;
    an indication of a number of layers used for transmitting the first multi-allocation precoding transmission per antenna element of the first plurality of antenna elements; or
    an indication of one or more demodulation reference signal (DMRS) associated with each antenna element of the first plurality of antenna elements.

4. The method of claim 3, wherein the configuration information depends on at least one of channel conditions between the network entity and UE or a temperature associated with one or more components of the network entity, including the first plurality of antenna elements.

5. The method of claim 1, wherein precoding the different portions of the first modulated signal using different precoders, comprises at least:
    applying a first precoder to the first modulated signal to obtain a first differently precoded signal of the first plurality of differently precoded signals corresponding to a first portion of the first modulated signal and to a first antenna element of the first plurality of antenna elements; and
    applying a second precoder to the first modulated signal to obtain a second differently precoded signal of the first plurality of differently precoded signals corresponding to a second portion of the first modulated signal and to a second antenna element of the first plurality of antenna elements.

6. The method of claim 5, wherein:
    applying the first precoder to the first modulated signal removes portions of the first modulated signal, from the first differently precoded signal, other than the first portion of the first modulated signal, including at least the second portion of the first modulated signal; and
    applying the second precoder to the first modulated signal removes portions of the first modulated signal, from the second differently precoded signal, other than the second portion of the first modulated signal, including at least the first portion of the first modulated signal.

7. The method of claim 6, wherein:
    to remove the other portions of the first modulated signal other than the first portion from the first differently precoded signal, the first precoder reduces a transmission power associated with these other portions to zero; and
    to remove the other portions of the first modulated signal other than the second portion from the second differently precoded signal, the second precoder reduces a transmission power associated with these other portions to zero.

8. The method of claim 1, wherein different portions of the first modulated signal are allocated to respective different antenna elements of a first plurality of antenna elements of the network entity for transmission.

9. The method of claim 8, further comprising determining the allocation of the different portions of the first modulated signal to the different antenna elements of the network entity based on at least one of:

a link capacity between the network entity and UE and an error vector magnitude (EVM) associated with the network entity; or a machine learning algorithm.

10. The method of claim 1, further comprising:

transmitting, to the UE, configuration information to configure the UE to transmit a second multi-allocation precoding transmission including a second plurality of differently precoded signals;

receiving, based on the configuration information, the second multi-allocation precoding transmission including the second plurality of differently precoded signals, wherein each differently precoded signal of the second plurality of differently precoded signals corresponds to a respective different portion of a second modulated signal and to a different antenna element of a second plurality of antenna elements of the UE;

combining the second plurality of differently precoded signals to obtain the second modulated signal; and demodulating the second modulated signal.

11. The method of claim 10, wherein the configuration information comprises:

a number of antenna elements of the second plurality of antenna elements to use to for transmitting the second multi-allocation precoding transmission; and an allocation of the respective different portions of the second modulated signal to the different antenna elements of the network entity.

12. The method of claim 11, further comprising receiving, from the UE, capability information indicating a number of antenna elements capable of multi-allocation precoding and a respective error vector magnitude (EVM) for each antenna element in the number of antenna elements capable of multi-allocation precoding, wherein:

the number of antenna elements of the second plurality of antenna elements to use to for transmitting the second multi-allocation precoding transmission is based the capability information received from the UE; and the allocation of the respective different portions of the second modulated signal to the different antenna elements of the network entity is based on the capability information received from the UE.

13. The method of claim 11, further comprising:

transmitting, to the UE, a request to transmit a reference signal from each antenna element of the second plurality of antenna elements of the UE; and performing error vector magnitude (EVM) measurements for each antenna element of the second plurality of antenna elements of the UE based on the reference signal transmitted from that antenna element, wherein:

the number of antenna elements of the second plurality of antenna elements to use to for transmitting the second multi-allocation precoding transmission is based the EVM measurements; and the allocation of the respective different portions of the second modulated signal to the different antenna elements of the second plurality of antenna elements of the UE is based on the EVM measurements.

14. The method of claim 1, wherein the different portions of the first modulated signal correspond to different subchannels of the first modulated signal.

15. A method for wireless communication by a user equipment (UE), comprising:

receiving configuration information for receiving a first multi-allocation precoding transmission from a network entity;

receiving, from the network entity, the first multi-allocation precoding transmission including a first plurality of differently precoded signals corresponding to a first modulated signal, wherein each differently precoded signal of the first plurality of differently precoded signals corresponds to:

a respective different portion of a first modulated signal; and a different antenna element of a first plurality of antenna elements of the network entity;

combining the first plurality of differently precoded signals to obtain the first modulated signal; and demodulating the first modulated signal.

16. The method of claim 15, wherein the configuration information comprises at least one of:

a number of antenna elements of the first plurality of antenna elements used to transmit the first multi-allocation precoding transmission;

information indicating an allocation of the different portions of the first modulated signal to the different antenna elements of the network entity;

an indication of a number of layers used for transmitting the first multi-allocation precoding transmission per antenna element of the first plurality of antenna elements; or an indication of one or more demodulation reference signal (DMRS) associated with each antenna element of the first plurality of antenna elements.

17. The method of claim 16, wherein the allocation of the different portions of the first modulated signal to the different antenna elements of the network entity is based on at least one of:

a link capacity between the network entity and UE and an error vector magnitude (EVM) associated with the network entity; or a machine learning algorithm.

18. The method of claim 16, wherein the configuration information depends on at least one of channel conditions between the network entity and UE or a temperature associated with one or more components of the network entity, including the first plurality of antenna elements.

19. The method of claim 15, wherein:

the first plurality of differently precoded signals comprises at least a first differently precoded signal and a second differently precoded signal;

the first differently precoded signal is based on a first precoder applied to the first modulated signal, wherein the first differently precoded signal corresponds to a first portion of the first modulated signal and to a first antenna element of the first plurality of antenna elements of the network entity; and the second differently precoded signal is based on a second precoder applied to the first modulated signal, wherein the second differently precoded signal corresponds to a second portion of the first modulated signal and to a second antenna element of the first plurality of antenna elements of the network entity.

20. The method of claim 19, wherein:
based on the first precoder, portions of the first modulated signal other than the first portion of the first modulated signal are removed from the first differently precoded signal, including at least the second portion of the first modulated signal; and
based on the second precoder, portions of the first modulated signal other than the second portion of the first modulated signal are removed from the second differently precoded signal, including at least the first portion of the first modulated signal.

21. The method of claim 20, wherein:
based on the first precoder, the other portions of the first modulated signal other than the first portion that are removed from the first differently precoded signal have transmission powers below a noise floor power associated with the first antenna element; and
based on the second precoder, the other portions of the first modulated signal other than the second portion that are removed from the second differently precoded signal have transmission powers below a noise floor power associated with the second antenna element.

22. The method of claim 15, further comprising:
receiving, from the network entity, configuration information to configure the UE to transmit a second multi-allocation precoding transmission including a second plurality of differently precoded signals;
obtaining a second modulated signal for transmission;
performing, based on the configuration information, multi-allocation precoding on the second modulated signal to obtain a second multi-allocation precoding transmission, comprising precoding different portions of the second modulated signal using different precoders to obtain a second plurality of differently precoded signals, wherein each differently precoded signal of the second plurality of differently precoded signals corresponds to:
a respective different portion of the second modulated signal; and
a different antenna element of a second plurality of antenna elements of the UE; and
transmitting, to the network entity, the second multi-allocation precoding transmission, including the second plurality of differently precoded signals, using the second plurality of antenna elements.

23. The method of claim 22, wherein transmitting the second multi-allocation precoding transmission comprises transmitting each differently precoded signal of the second plurality of differently precoded signals using the different antenna element, of the second plurality of antenna elements, corresponding to that differently precoded signal.

24. The method of claim 22, wherein the configuration information comprises:
a number of antenna elements of the second plurality of antenna elements to use to for transmitting the second multi-allocation precoding transmission; and
an allocation of the respective different portions of the second modulated signal to the different antenna elements of the network entity.

25. The method of claim 24, further comprising transmitting, to the network entity, capability information indicating a number of antenna elements capable of multi-allocation precoding and a respective error vector magnitude (EVM) for each antenna element in the number of antenna elements capable of multi-allocation precoding, wherein:
the number of antenna elements of the second plurality of antenna elements to use to for transmitting the second multi-allocation precoding transmission is based the capability information transmitted to the network entity; and
the allocation of the respective different portions of the second modulated signal to the different antenna elements of the network entity is based on the capability information transmitted to the network entity.

26. The method of claim 24, further comprising:
receiving, from the network entity, a request to transmit a reference signal from each antenna element of the second plurality of antenna elements of the UE; and
transmitting the reference signal from each antenna element of the second plurality of antenna elements, wherein:
the number of antenna elements of the second plurality of antenna elements to use to for transmitting the second multi-allocation precoding transmission is based on error vector magnitude (EVM) measurements associated with the reference signals transmitted from each antenna element of the second plurality of antenna elements; and
the allocation of the respective different portions of the second modulated signal to the different antenna elements of the second plurality of antenna elements of the UE is based on the EVM measurements.

27. The method of claim 15, wherein the different portions of the first modulated signal correspond to different sub-channels of the first modulated signal.

28. The method of claim 15, further comprising performing separate channel estimation measurements for each differently precoded signal in the first plurality of differently precoded signals.

29. A network entity, comprising:
a memory comprising executable instructions; and
a processor configured to execute the executable instructions and cause the network entity to:
obtain a first modulated signal for transmission;
perform multi-allocation precoding on the first modulated signal to obtain a first multi-allocation precoding transmission, wherein:
in order to perform the multi-allocation precoding on the first modulated signal, the processor is configured to cause the network entity to precode different portions of the first modulated signal using different precoders to obtain a first plurality of differently precoded signals; and
each differently precoded signal of the first plurality of differently precoded signals corresponds to:
a respective different portion of the different portions of the first modulated signal; and
a different antenna element of a first plurality of antenna elements of the network entity; and
transmit, to a user equipment (UE), the first multi-allocation precoding transmission, including the plurality of differently precoded signals, using the first plurality of antenna elements.

30. A user equipment (UE), comprising:
a memory comprising executable instructions; and
a processor configured to execute the executable instructions and cause the UE to:
receive configuration information for receiving a first multi-allocation precoding transmission from a network entity;
receive, from the network entity, the first multi-allocation precoding transmission including a first plurality of differently precoded signals corresponding to a first modulated signal, wherein each differently precoded signal of the first plurality of differently pre-
coded signals corresponds to:

a respective different portion of a first modulated
signal; and a different antenna element of a first plurality of
antenna elements of the network entity;

combine the first plurality of differently precoded sig-
nals to obtain the first modulated signal; and demodulate the first modulated signal.

* * * * *